(12) United States Patent
Wei et al.

(10) Patent No.: US 12,520,302 B2
(45) Date of Patent: Jan. 6, 2026

(54) SYSTEM AND METHOD FOR SIGNAL TRANSMISSION

(71) Applicant: ZTE CORPORATION, Guangdong (CN)

(72) Inventors: Xingguang Wei, Shenzhen (CN); Yu Ngok Li, Shenzhen (CN); Peng Hao, Shenzhen (CN); Jian Li, Shenzhen (CN); Shuqiang Xia, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 723 days.

(21) Appl. No.: 17/873,961

(22) Filed: Jul. 26, 2022

(65) Prior Publication Data

US 2022/0369337 A1 Nov. 17, 2022

Related U.S. Application Data

(63) Continuation of application No. PCT/CN2020/083907, filed on Apr. 9, 2020.

(51) Int. Cl.
*H04W 72/1268* (2023.01)
*H04L 27/26* (2006.01)
*H04W 76/20* (2018.01)

(52) U.S. Cl.
CPC ... *H04W 72/1268* (2013.01); *H04L 27/26025* (2021.01); *H04W 76/20* (2018.02)

(58) Field of Classification Search
CPC .............. H04W 72/1268; H04W 76/20; H04L 27/26025
See application file for complete search history.

(56) References Cited

U.S. PATENT DOCUMENTS 10,863,571 B2 * 12/2020 Cirik ...................... H04W 24/08
10,893,535 B2 * 1/2021 Kim ....................... H04W 16/14
(Continued)

FOREIGN PATENT DOCUMENTS

CN 101931448 A 12/2010
CN 101969337 A 2/2011
(Continued)

OTHER PUBLICATIONS

Huawei et al.: "Correction on transmission mode 9 with a single anten na port transmission" 3GPP TSG-RAN WGI Meeting #69; R1-122901; May 25, 2012; Prague, Czech Republic (6 pages).
(Continued)

*Primary Examiner* — Khaled M Kassim
(74) *Attorney, Agent, or Firm* — Foley & Lardner LLP

(57) ABSTRACT

A system and method for an uplink signal transmission. The system and method includes supporting, by a wireless communication device, transmitting single-port uplink signals on a first carrier in response to determining that the wireless communication device is in a first transmission method; supporting, by the wireless communication device, transmitting the single-port uplink signals or dual-port uplink signals on a second carrier in response to determining that the wireless communication device is in a second transmission method; and determining, by the wireless communication device based on scheduling information received from a base station, a transmission method used to transmit uplink signals, the transmission method comprises the first transmission method or the second transmission method.

14 Claims, 11 Drawing Sheets

(56) References Cited

U.S. PATENT DOCUMENTS

| | | | |
|---|---|---|---|
| 11,611,968 B2* | 3/2023 | Hwang | H04W 72/51 |
| 11,647,412 B2* | 5/2023 | Kim | H04L 5/0023 |
| | | | 370/329 |
| 12,035,404 B2* | 7/2024 | Cirik | H04B 7/0695 |
| 12,058,632 B2* | 8/2024 | Ko | H04W 56/001 |
| 2014/0241232 A1 | 8/2014 | Damji et al. | |
| 2015/0173026 A1 | 6/2015 | Ahn et al. | |
| 2018/0007707 A1 | 1/2018 | Rico Alvarino et al. | |
| 2018/0048366 A1 | 2/2018 | Sundararajan et al. | |
| 2019/0394733 A1 | 12/2019 | Yang et al. | |
| 2022/0132342 A1* | 4/2022 | Kim | H04W 74/0816 |

FOREIGN PATENT DOCUMENTS

| | | |
|---|---|---|
| CN | 103327538 A | 9/2013 |
| CN | 110650472 A | 1/2020 |
| WO | WO-2011/082576 A1 | 7/2011 |
| WO | WO-2019/242679 A1 | 12/2019 |

OTHER PUBLICATIONS

International Search Report and Written Opinion for PCT Appl. No. PCT/CN2020/083907 mailed Dec. 30, 2020 (8 pages).

Extended European Search Report for EP Appl. No. 20891023.2, dated Dec. 8, 2022 (11 pages).

First Office Action for CN App. No. 2020800829899 dated Jun. 13, 2024 (with English translation, 14 pages).

China Telecom, "[100e-5.1LS-TxSwitching-03] Email discussion/approval on remaining issues on inter-band UL CA", 3GPP TSG RAN WG1 #100, R1-2001275, Mar. 6, 2020, e-Meeting (20 pages).

ZTE Corporation, "Remaining Issues on Support of Tx Switching between Two Uplink Carriers", 3GPP TSG RAN WG1 Meeting #100, R1-2001132, Mar. 6, 2020, e-Meeting (18 pages).

* cited by examiner

1000

supporting, by a wireless communication device, transmitting single-port uplink signals on a first carrier in response to determining that the wireless communication device is in a first transmission method
1002 supporting, by the wireless communication device, transmitting the single-port uplink signals or dual-port uplink signals on a second carrier in response to determining that the wireless communication device is in a second transmission method
1004 determining, by the wireless communication device based on scheduling information received from a base station, a transmission method used to transmit uplink signals, the transmission method comprises the first transmission method or the second transmission method
1006

FIG. 10

SYSTEM AND METHOD FOR SIGNAL TRANSMISSION

CROSS-REFERENCE TO RELATED APPLICATION

This application claims the benefit of priority under 35 U.S.C. § 120 as a continuation of PCT Patent Application No. PCT/CN2020/083907, filed on Apr. 9, 2020, the disclosure of which is incorporated herein by reference in its entirety.

TECHNICAL FIELD

The disclosure relates generally to wireless communications and, more particularly, to systems and methods for signal transmission.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

One aspect disclosed herein is directed to a method for an uplink signal transmission. In some embodiments, the method includes supporting, by a wireless communication device (e.g., UE 104 in FIG. 1), transmitting single-port uplink signals on a first carrier in response to determining that the wireless communication device is in a first transmission method. In some embodiments, the method includes supporting, by the wireless communication device, transmitting the single-port uplink signals or dual-port uplink signals on a second carrier in response to determining that the wireless communication device is in a second transmission method. In some embodiments, the method includes determining, by the wireless communication device based on scheduling information received from a base station, a transmission method used to transmit uplink signals, the transmission method comprises the first transmission method or the second transmission method.

In some embodiments, the method includes determining, by the wireless communication device, a transmission mode for the wireless communication device using a Radio Resource Control (RRC) parameter received from the base station, wherein in response to determining that the RRC parameter indicates that the transmission mode is a first transmission mode, the wireless communication device supports transmitting the single-port uplink signals on the first carrier using the first transmission method.

In some embodiments, in response to determining that: a previous uplink transmission is transmitted using the first carrier; and based on the scheduling information, the wireless communication device determines to transmit a next uplink signal on a next transmission occasion on the second carrier, the wireless communication device: switches to the second transmission method; and does not request transmitting any uplink signals using the first carrier or the second carrier within a time interval T before transmitting the next uplink signal; and in response to determining that: the previous uplink transmission is transmitted using the second carrier; and based on the scheduling information, the wireless communication device determines to transmit the next uplink signal on the next transmission occasion on the first carrier, the wireless communication device: switches to the first transmission method; and does not request transmitting any uplink signals using the first carrier or the second carrier within the time interval T before transmitting the next uplink signal.

In some embodiments, in response to determining that: the wireless communication device is currently using the first transmission method; and based on the scheduling information, the wireless communication device determines to transmit a next uplink signal on a next transmission occasion on the second carrier, the wireless communication device: switches to the second transmission method; and does not request transmitting any uplink signals using the first carrier or the second carrier within a time interval T before transmitting the next uplink signal; and in response to determining that: the wireless communication device is currently using the second transmission method; and based on the scheduling information, the wireless communication device determines to transmit the next uplink signal on the next transmission occasion on the first carrier, the wireless communication device: switches to the first transmission method; and does not request transmitting any uplink signals using the first carrier or the second carrier within the time interval T before transmitting the next uplink signal.

In some embodiments, in response to determining that: the wireless communication device is currently using the first transmission method; and based on the scheduling information, the wireless communication device determines to transmit a dual-port uplink signal on a next transmission occasion on the second carrier, the wireless communication device: switches to the second transmission method; and does not request transmitting any uplink signals using the first carrier or the second carrier within a time interval T before transmitting the dual-port uplink signal; and in response to determining that: the wireless communication device is currently using the second transmission method; and based on the scheduling information, the wireless communication device determines to transmit a next uplink signal on the next transmission occasion on the first carrier, the wireless communication device: switches to the first transmission method; and does not request transmitting any uplink signals using the first carrier or the second carrier within the time interval T before transmitting the next uplink signal.

In some embodiments, in response to determining that: a time interval T corresponds to the first carrier; the wireless communication device is using the first transmission method before an uplink phase; and based on the scheduling information, the wireless communication device determines to transmit a next uplink signal in the uplink phase on the second carrier, the wireless communication device: switches to the second transmission method; and does not request transmitting any uplink signals using the first carrier or the second carrier within the time interval T before the uplink phase starts; in response to determining that: the time interval T corresponds to the first carrier; the wireless communication device is using the second transmission method before the uplink phase; and based on the scheduling information, the wireless communication device determines to transmit the next uplink signal in the uplink phase on the first carrier, the wireless communication device: switches to the first transmission method; and does not request transmitting any uplink signals using the first carrier or the second carrier within the time interval T before the uplink phase starts. in response to determining that: the time interval T corresponds to the first carrier; the wireless communication device is using the second transmission method in the uplink phase; and based on the scheduling information, the wireless communication device determines to transmit the next uplink signal after the uplink phase on the first carrier, the wireless communication device: switches to the first transmission method; and does not request transmitting any uplink signals using the first carrier or the second carrier within the time interval T after the uplink phase ends.

In some embodiments, in response to determining that: a time interval T corresponds to the second carrier; the wireless communication device is using the first transmission method before an uplink phase; and based on the scheduling information, the wireless communication device determines to transmit a next uplink signal in the uplink phase on the second carrier, the wireless communication device: switches to the second transmission method; and does not request transmitting any uplink signals using the first carrier or the second carrier within the time interval T after the uplink phase begins; in response to determining that: the time interval T corresponds to the second carrier; the wireless communication device is using the second transmission method before the uplink phase; and based on the scheduling information, the wireless communication device determines to transmit the next uplink signal in the uplink phase on the first carrier, the wireless communication device: switches to the first transmission method; and does not request transmitting any uplink signals using the first carrier or the second carrier within the time interval T after the uplink phase begins; and in response to determining that: the time interval T corresponds to the second carrier; the wireless communication device is using the second transmission method in the uplink phase; and based on the scheduling information, the wireless communication device determines to transmit the next uplink signal after the uplink phase on the first carrier, the wireless communication device: switches to the first transmission method; and does not request transmitting any uplink signals using the first carrier or the second carrier within the time interval T before the uplink phase ends.

In some embodiments, in response to determining that: a time interval T corresponds to the first carrier; the wireless communication device is using the first transmission method before an uplink phase; and based on the scheduling information, the wireless communication device determines to transmit a dual-port uplink signal in the uplink phase on the second carrier, the wireless communication device: switches to the second transmission method; and does not request transmitting any uplink signals using the first carrier or the second carrier within the time interval T before the uplink phase begins; in response to determining that: the time interval T corresponds to the first carrier; the wireless communication device is using the second transmission method before the uplink phase; and based on the scheduling information, the wireless communication device determines to transmit a next uplink signal in the uplink phase on the first carrier, the wireless communication device: switches to the first transmission method; and does not request transmitting any uplink signals using the first carrier or the second carrier before the time interval T before the uplink phase begins; and in response to determining that: the time interval T corresponds to the first carrier; the wireless communication device is using the second transmission method in the uplink phase; and based on the scheduling information, the wireless communication device determines to transmit the next uplink signal after the uplink phase on the first carrier, the wireless communication device: switches to the first transmission method; and does not request transmitting any uplink signals using the first carrier or the second carrier within the time interval T after the uplink phase ends.

In some embodiments, in response to determining that: a time interval T corresponds to the second carrier; the wireless communication device is using the first transmission method before an uplink phase; and based on the scheduling information, the wireless communication device determines to transmit a dual-port uplink signal in the uplink phase on the second carrier, the wireless communication device: switches to the second transmission method; and does not request transmitting any uplink signals using the first carrier or the second carrier within the time interval T after the uplink phase begins; in response to determining that: the time interval T corresponds to the second carrier; the wireless communication device is using the second transmission method before the uplink phase; and based on the scheduling information, the wireless communication device determines to transmit a next uplink signal in the uplink phase on the first carrier, the wireless communication device: switches to the first transmission method; and does not request transmitting any uplink signals using the first carrier or the second carrier before the time interval T after the uplink phase begins; and in response to determining that: the time interval T corresponds to the second carrier; the wireless communication device is using the second transmission method in the uplink phase; and based on the scheduling information, the wireless communication device determines to transmit the next uplink signal after the uplink phase on the first carrier, the wireless communication device: switches to the first transmission method; and does not request transmitting any uplink signals using the first carrier or the second carrier within the time interval T before the uplink phase ends.

In some embodiments, the wireless communication device does not request transmitting uplink signals using the first carrier or the second carrier based on an uplink phase; the uplink phase has a length of a time slot length; the time slot length corresponds to a larger one of a first Numerology of an activated Bandwidth Part (BWP) of the first carrier and a second Numerology of an activated BWP of the second carrier.

In some embodiments, in response to the wireless communication device switches the transmission method, a radio frequency switching time T is located in a boundary of a time slot or in flexible symbols of a flexible time slot.

In some embodiments, the wireless communication device is to transmit a first uplink signal using one of the first transmission method and the second transmission method, and to transmit a second uplink signal using a different one of the first transmission method and the second transmission method; in response to determining that a time interval between a last symbol of the first uplink signal and a first symbol of the second uplink signal is less than a radio frequency switching time T, the wireless communication device does not transmit the second uplink signal.

In some embodiments, the wireless communication device is to transmit a first uplink signal using one of the first transmission method and the second transmission method, and to transmit a second uplink signal using a different one of the first transmission method and the second transmission method; in response to determining that: a time interval between a last symbol of the first signal and a first symbol of the second signal is less than a radio frequency switching time T, and the second uplink signal is a terminal-self-transmitted uplink signal, the wireless communication device transmits the second uplink signal.

Another aspect disclosed herein is directed to a method for managing uplink transmissions. In some embodiments, the method includes receiving, by a base station from a wireless communication device, single-port uplink signals on a first carrier as the wireless communication device is transmitting using a first transmission method. In some embodiments, the method includes receiving, by the base station from the wireless communication device, the single-port uplink signals or dual-port uplink signals on a second carrier as the wireless communication device is transmitting using a second transmission method. In some embodiments, the method includes transmitting, by the base station to the wireless communication device, scheduling information indicating a transmission method used by the wireless communication device to transmit uplink transmissions, the transmission method comprises the first transmission method or the second transmission method.

In some embodiments, the method includes transmitting, by the base station to the wireless communication device, a Radio Resource Control (RRC) parameter, the RRC parameter indicates that a transmission mode of the wireless communication device. In some embodiments, the transmission mode is a first transmission mode, the wireless communication device supports transmitting the single-port uplink signals on the first carrier using the first transmission method.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 10 is a flow diagram depicting a method for an uplink signal transmission from the perspective of a wireless communication device, in accordance with some embodiments of the present disclosure.

DETAILED DESCRIPTION OF EXEMPLARY EMBODIMENTS

Figure 1:
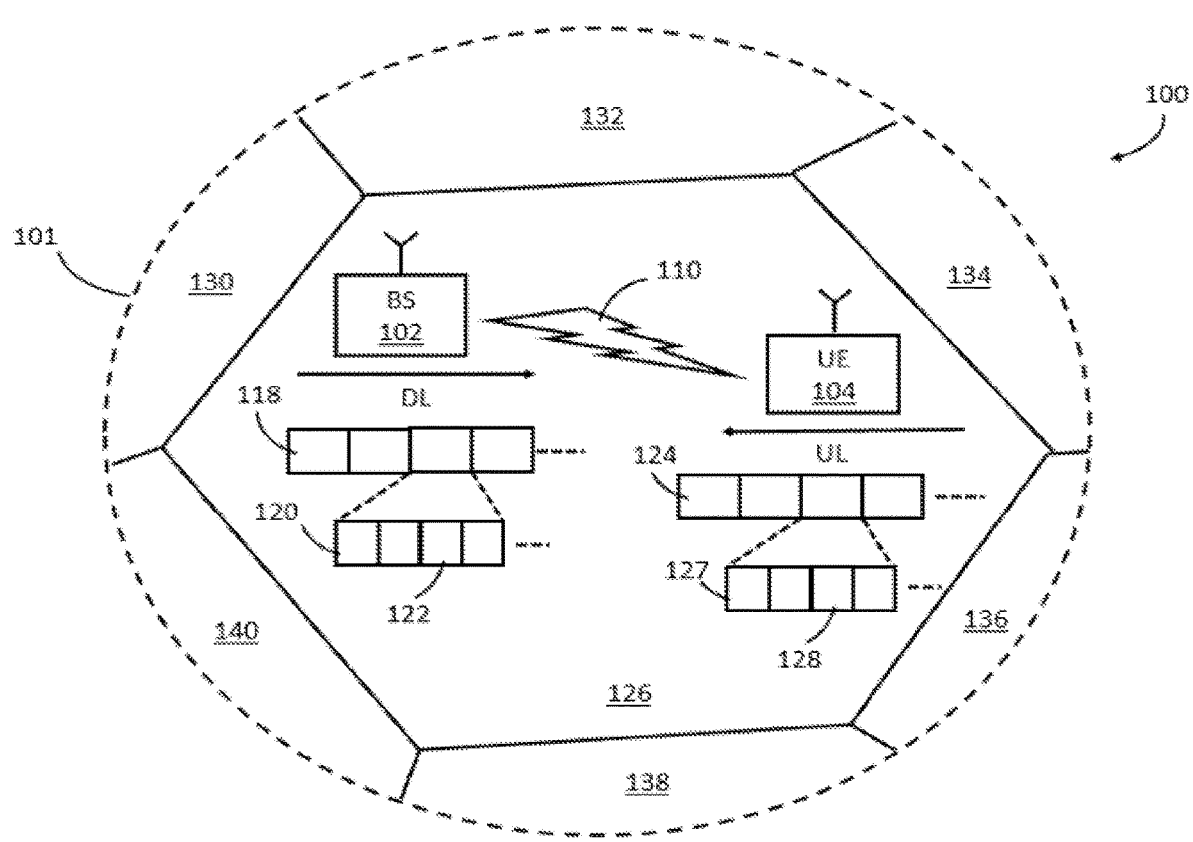
FIG. 1 illustrates an example wireless communication network, and/or system, 100 in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

3GPP 3rd Generation Partnership Project
5G 5th Generation Mobile Networks
5G-AN 5G Access Network
5G gNB Next Generation NodeB
BWP Bandwidth Part
DCI Downlink Control Information
DL Down Link or Downlink
DRX Discontinuous Reception
E-UTRA Evolved Universal Mobile Telecommunication System Terrestrial RA
eMBB Enhanced Mobile Broadband
eNB Evolved Node B
ETSI European Telecommunications Standards Institute
LTE Long Term Evolution
MAC Medium Access Control
MIMO Multiple Input Multiple Output
MSC Mobile Switching Center
NAS Non-Access Stratum
NR Next Generation RAN
OFDM Orthogonal Frequency-Division Multiplexing
OFDMA Orthogonal Frequency-Division Multiple Access
OSI Open Systems Interconnection
PDCCH Physical Downlink Control Channel
PDCP Packet Data Convergence Protocol
PDSCH Physical Downlink Shared Channel
PUCCH Physical Uplink Control Channel
PUSCH Physical Uplink Shared Channel
RA Radio Access
RF Radio Frequency
RLC Radio Link Control
RRC Radio Resource Control
SRI SRS Resource Indicator
SRS Sounding Reference Signal
UE User Equipment
UL Up Link or Uplink The 5G NR environment may, in some embodiments, include a base station (e.g., BS 102 in FIG. 1) that configures (e.g., initializes, sets, adjusts, etc.) two carriers for a terminal (e.g., UE 104 in FIG. 1), that is, carrier 1 and carrier 2. Carrier 1 may, in some embodiments, be a Long Term Evolution (LTE) carrier or a NR carrier, and carrier 2 may be a NR carrier. In order to take full advantage of the Multiple Input Multiple Output (MIMO) technology of the NR system, the terminal uses two antenna ports to send a dual-port uplink signal on carrier 2. Sending a dual-port uplink signal on carrier 2, in some embodiments, requires the terminal to be configured with two sets of radio frequency chain. In addition, the terminal may need a set of radio frequency chain to send single-port uplink signals on carrier 1. If the terminal sends uplink signals on carrier 1 and carrier 2 at the same time, then the terminal may need to configure a total of three sets of radio frequency chain.

However, configuring multiple sets (three in this instance) of radio chain could result in a higher terminal costs to manufacture the 5G NR environment. Thus, a mechanism is needed for configuring a terminal to fully utilize the advantages of the MIMO technology on one carrier (e.g., carrier 2), but without increasing the terminal cost.

Accordingly, the present disclosure is directed to systems and methods for configuring a terminal to fully utilize the advantages of the MIMO technology on one carrier (e.g., carrier 2), but without increasing the terminal cost.

Furthermore, in the LTE protocol, the PDCCH can, in some embodiments, only be configured on the first 3 symbols of each subframe. In order to further improve the flexibility of the system, the 5G NR protocol removes this restriction, and the PDCCH can be configured at any position in the time slot. For example, there is a typical design where the base station configures two parts of the PDCCH in each time slot, the first part of the PDCCH is in the front of the time slot, such as on the first symbol of the time slot; the second part configures the PDCCH in the middle of the time slot, such as on the 8th symbol of the time slot. Configuring multiple parts of the PDCCH in a time slot can improve system flexibility and reduce service scheduling delay The PDCCH carries DCI, and the NR protocol defines multiple DCIs in different formats. DCI can, in some embodiments, be used to indicate the status information of the terminal. The terminal may, in some embodiments, determine whether the status of the terminal needs to be updated based on the status information indicated by the base station, such as entering DRX Active Time, entering dormant bandwidth part (BWP), and so on.

However, because the PDCCH in the 5G NR protocol can be configured at any position, the terminal may need to be prepared to update the terminal status at any position where it is possible to receive a DCI that carries the DCI indicating the status information of the terminal, which requires the terminal to implement complexity higher. Thus, a mechanism is needed for reducing the implementation complexity of the terminal while enabling the terminal to meet the flexibility of the 5G NR configuration of the 5G NR system Accordingly, the present disclosure is also directed to systems and methods for reducing the implementation complexity of the terminal while enabling the terminal to meet the flexibility of the 5G NR configuration of the 5G NR system.

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
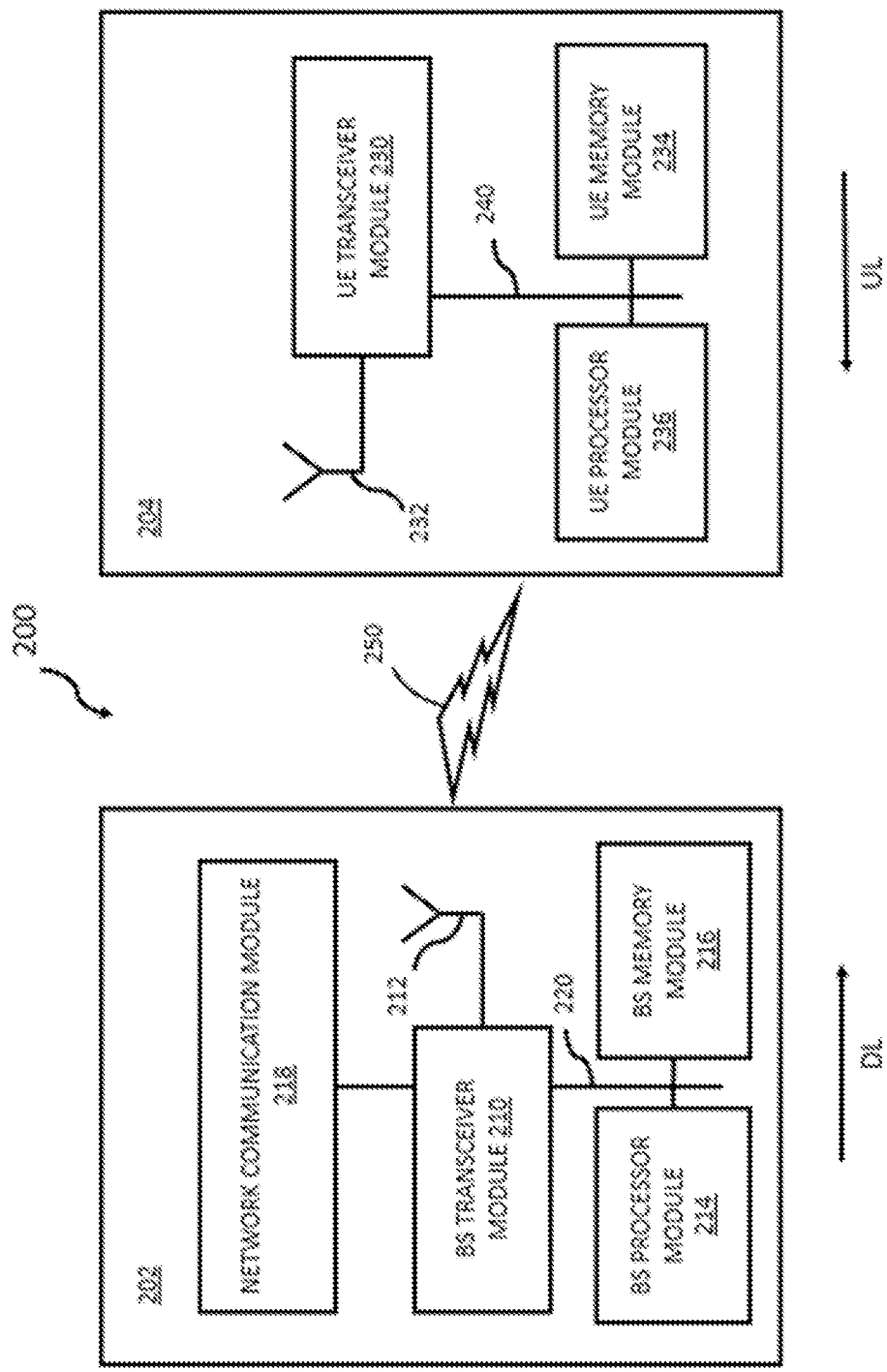
FIG. 2 illustrates a block diagram of an example wireless communication system 200 for transmitting and receiving wireless communication signals (e.g., OFDM/OFDMA signals) in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present disclosure. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Configuring a Terminal(s) for MIMO Technology

This portion of the present disclosure describes various configuration cases in which a terminal (e.g., UE 104 in FIG. 1) may utilize the advantages of the MIMO technology on one carrier (e.g., carrier 2), but without increasing the terminal cost. Any of the features and/or functions of a configuration case may be combined, in any order, with any number of the features and/or functions of one or more of the other configuration cases.

2.1. Configuration Case 1

As discussed in greater detail below, an uplink signal transmission method may, in some embodiments, include a terminal (e.g., UE 104 in FIG. 1) configured by a base station (e.g., BS 102 in FIG. 1) with two carriers, namely carrier 1 and carrier 2. The terminal may, in some embodiments, support only a single-port uplink signal on carrier 1. The terminal may, in some embodiments, support single-port uplink signals or dual-port uplink signals on carrier 2. The terminal may, in some embodiments, determine the uplink transmission method according to the scheduling information of the base station, that is, the first transmission method or the second transmission method.

2.1.1. Example Embodiment(s)

A base station (e.g., BS 102 in FIG. 1) may, in some embodiments, configure (e.g., initializes, sets, adjusts, etc.) two carriers for a terminal (e.g., UE 104 in FIG. 1), that is, carrier 1 and carrier 2. Carrier 1 may, in some embodiments, be an LTE carrier or a NR carrier, and carrier 2 may be a NR carrier.

When carrier 1 is an LTE carrier and carrier 2 is an NR carrier, the base station may, in some embodiments, configure the terminal with an EN-DC (e.g., E-UTRA NR dual connectivity with MCG using E-UTRA and SCG using NR) operation. In a case where carrier 1 is an NR carrier and carrier 2 is an NR carrier, the base station may, in some embodiments, configure the terminal with a carrier aggregation (CA) operation.

The terminal on carrier 1 may, in some embodiments, only support sending (e.g., transmitting, delivering, etc.) single-port uplink signals; the terminal on carrier 2 may, in some embodiments, support sending single-port uplink signals or dual-port uplink signals. The terminal may, in some embodiments, use one antenna port to send single-port uplink signals, and uses two antenna ports to send dual-port uplink signals. For additional details about the antenna port, refer to the 3GPP protocol TS38.211.

The uplink signal, in some embodiments, may include at least one of the following: a Physical Uplink Shared Channel (PUSCH), a Physical Uplink Control Channel (PUCCH), a Physical Random-Access Channel (PRACH), and a Sounding reference signal (SRS).

The single-port uplink signal may, in some embodiments, include at least one of the following: a PUCCH, a PRACH, a single-port SRS, a PUSCH scheduled in DCI format 0_0, a PUSCH with a precoding matrix of $1/\sqrt{2}[_0^1]$, a PUSCH with a precoding matrix of $1/\sqrt{2}[_1^0]$.

For a Non-Codebook based UL transmission, the single-port uplink signal may, in some embodiments, include the PUSCH scheduled by DCI format 0_1 or DCI format 0_2, and the SRI field of this DCI format 0_1 or DCI format 0_2 indicates only one SRS resource.

For a Codebook based UL transmission, the single-port uplink signal may, in some embodiments, include the PUSCH scheduled by DCI format 0_1 or DCI format 0_2, and the SRI field of DCI format 0_1 or DCI format 0_2 indicates a single-port SRS resource.

The dual-port uplink signal may, in some embodiments, include at least one of the following: a PUSCH scheduled in DCI format 0_1, a PUSCH scheduled in DCI format 0_1 or DCI format 0_2 with a precoding matrix other than $1/\sqrt{2}[_0^1]$, and a PUSCH scheduled in DCI format 0_1 or DCI format 0_2 with a precoding matrix other than $1/\sqrt{2}[_0^1]$.

For a Non-Codebook based UL transmission, the dual-port uplink signal may, in some embodiments, include the PUSCH scheduled by DCI format 0_1 or DCI format 0_2, and the SRI field of this DCI format 0_1 or DCI format 0_2 may, in some embodiments, indicate two SRS resources For a Codebook based UL transmission, the dual-port uplink signal may, in some embodiments, include the PUSCH scheduled by DCI format 0_1 or DCI format 0_2, and the SRI field of this DCI format 0_1 or DCI format 0_2 may, in some embodiments, indicate a dual-port SRS resource.

The terminal may, in some embodiments, determine the uplink transmission method according to the scheduling information of the base station, that is, the first transmission method or the second transmission method.

The scheduling information may, in some embodiments, include at least one of the following: a DCI (e.g., a PUSCH scheduling information contained in DCI), and an RRC signaling (e.g., service request (SR) configuration information carried in RRC signaling).

2.2. Configuration Case 2

According to Case 1 (as discussed herein), when the terminal uses or is in the first transmission method, the terminal may, in some embodiments, support sending a single-port uplink signal on carrier 1. When the terminal uses or is in the second transmission method, the terminal may, in some embodiments, support sending a single-port uplink signal or a dual-port uplink signal on the carrier 2.

2.2.1. Example Embodiment(s)

The base station may, in some embodiments, configure two uplink carriers for the terminal through RRC signaling, that is, carrier 1 and carrier 2. The terminal may, in some embodiments, include two transmission methods, namely the first transmission method and the second transmission method. When the terminal is in the first transmission method, the terminal may, in some embodiments, support sending a single-port uplink signal on carrier 1. When the terminal is in the second transmission method, the terminal may, in some embodiments, support sending a single-port uplink signal or a dual-port uplink signal on carrier 2.

Generally speaking, carrier 1 may be a carrier with a lower center frequency, which is used to ensure the uplink coverage of the network. It is not necessary, in some embodiments, to support MIMO technology on carrier 1. Therefore, when transmitting uplink signals on carrier 1, only one set of radio frequency chain may be required. Carrier 2 may be a carrier with a higher center frequency and a larger bandwidth. It is used, in some embodiments, to increase the uplink rate of the network. MIMO technology may be supported on carrier 2. Therefore, when transmitting uplink signals on carrier 2, a maximum of two sets of RF chain may be required.

The terminal may, in some embodiments, contain two sets of RF chain in total. When the terminal is in the first transmission method, one set of radio frequency chain may be reserved for carrier 1 to send uplink signals, and the other set may be reserved for carrier 2. The terminal may use the radio frequency chain reserved for carrier 1 to send a single-port uplink signal on carrier 1. However, when the terminal is in the first transmission method, the terminal may not be allowed to send an uplink signal on the carrier 2.

When the terminal is in the second transmission method, both sets of radio frequency chain of the terminal may be reserved for carrier 2 to send uplink signals. The terminal can, in some embodiments, use the radio frequency chain reserved for carrier 2 to send single-port uplink signals or dual-port uplink on carrier 2.

With this implementation, the terminal may determine the transmission methods according to which carrier the uplink signal is sent on, which may help simplify the terminal implementation. The specific judgment criteria may, in some embodiments, be: when the terminal sends an uplink signal on carrier 1, the terminal is in the first transmission method; and/or when the terminal sends an uplink signal on carrier 2, the terminal is in the second transmission method.

2.3. Configuration Case 3

According to Case 1 (as discussed herein), when the terminal is in the first transmission method, then in some embodiments, the terminal may support sending a single-port uplink signal on carrier 1; the terminal may support sending a single-port uplink signal on carrier 2; and/or the terminal may support simultaneous transmission of a single-port uplink signal on carrier 1 and carrier 2. When the terminal is in the second transmission method, then in some embodiments, the terminal may support sending single-port uplink signals or dual-port uplink signals on carrier 2.

2.3.1. Example Embodiment(s)

The base station may, in some embodiments, configure two uplink carriers for the terminal through RRC signaling, that is, carrier 1 and carrier 2. The terminal may include two transmission methods, namely the first transmission method and the second transmission method.

When the terminal is in the first transmission method: the terminal may support sending a single-port uplink signal on carrier 1; the terminal may support sending a single-port uplink signal on carrier 2; the terminal may support sending single-port uplink signals on carrier 1 and carrier 2 at the same time. When the terminal is in the second transmission method, the terminal may support sending a single-port uplink signal or a dual-port uplink signal on the carrier 2.

Generally speaking, carrier 1 may be a carrier with a lower center frequency, which may be used to ensure the uplink coverage of the network. It is not necessary, in some embodiments, to support MIMO technology on carrier 1. Therefore, when transmitting uplink signals on carrier 1, only one set of radio frequency chain may be required. Carrier 2 may be a carrier with a higher center frequency and a larger bandwidth. It may be used to increase the uplink rate of the network. MIMO technology may be supported on carrier 2. Therefore, when transmitting uplink signals on carrier 2, a maximum of two sets of RF chain may be required.

The terminal may contain two sets of RF chain in total. When the terminal is in the first transmission method, one set of radio frequency chain is, in some embodiments, reserved for carrier 1 to send uplink signals, and the other set is, in some embodiments, reserved for carrier 2. The terminal can, in some embodiments, use the radio frequency chain reserved for carrier 1 to send a single-port uplink signal on carrier 1. The terminal can, in some embodiments, use the radio frequency chain reserved for carrier 2 to send a single-port uplink signal on carrier 2. The terminal can, in some embodiments, send a single-port uplink signal on carrier 1 and carrier 2 at the same time. For example, a single-port PUSCH is transmitted on carrier 1, and another single-port PUSCH is transmitted on carrier 2.

When the terminal is in the second transmission method, both sets of radio frequency chain of the terminal may be reserved for carrier 2 to send uplink signals. The terminal may use the radio frequency chain reserved for carrier 2 to send single-port uplink signals or dual-port uplink on carrier 2.

With this implementation, the terminal may use the radio frequency chain to the greatest extent, and improve the uplink transmission efficiency of the system.

2.4. Configuration Case 4

According to Case 1 (as discussed herein), the terminal may determine a transmission mode of the terminal by using an RRC parameter sent by the base station, that is, the first transmission mode or the second transmission mode. In response to determining that the RRC parameter indicates that the transmission mode is a first transmission mode, the wireless communication device supports transmitting the single-port uplink signals on the first carrier using the first transmission method. The RRC parameter may, in some embodiments, be a part of the scheduling information. In some embodiments, a transmission mode (as used herein) may be different than a transmission method (as used herein).

2.4.1. Example Embodiment(s)

In some embodiments, the base station may configure one of the first transmission mode and the second transmission mode for the terminal through RRC signaling. When RRC signaling is configured with the second transmission mode, then the terminal, in some embodiments, does not support sending single-port uplink signals on carrier 1 and carrier 2 at the same time. When RRC signaling is configured with the first transmission mode, the terminal may support sending single port on carrier 1 and carrier 2 at the same time.

In one embodiment, the base station may configure one of the first transmission mode and the second transmission mode for the terminal through RRC signaling. When RRC signaling is configured to the second transmission mode, the terminal may send a single-port uplink signal on carrier 2 to trigger the terminal to switch the transmission method. When RRC signaling is configured to the first transmission mode, the single-port uplink signal on carrier 2 does not trigger the terminal to switch the transmission method.

The second transmission mode may help simplify terminal implementation, while the first transmission mode may help improve uplink transmission efficiency. The base station may flexibly configure the first transmission mode or the second transmission mode to the terminal through RRC signaling, which may help improve network flexibility.

2.5. Configuration Case 5

In a first case of where the last uplink transmission of the terminal on carrier 1, according to the scheduling information of the base station, if the terminal determines to send a next uplink signal on carrier 2 at the next transmission occasion, then the terminal, in some embodiments, does not request transmitting any uplink signals using carrier 1 or carrier 2 within a time interval T before transmitting the next uplink signal. In a second case of where the last uplink transmission of the terminal on carrier 2, according to the scheduling information of the base station, if the terminal will send a next uplink signal on carrier 1 at the next transmission occasion, then the terminal, in some embodiments, does not request transmitting any uplink signals using carrier 1 or carrier 2 within a time interval T before transmitting the next uplink signal. The time interval T is used for UE to switch the transmission method. For example, if the wireless communication device determines that a previous uplink transmission is transmitted using the first carrier (e.g., carrier 1), and based on the scheduling information, the wireless communication device determines to transmit a next uplink signal on a next transmission occasion on the second carrier (e.g., carrier 2), then the wireless communication device may: switch to the second transmission method, and does not request transmitting any uplink signals using the first carrier or the second carrier within a time interval T before transmitting the next uplink signal. As another example, if the wireless communication device determines that the previous uplink transmission is transmitted using the second carrier, and based on the scheduling information, the wireless communication device determines to transmit the next uplink signal on the next transmission occasion on the first carrier, then the wireless communication device may: switch to the first transmission method, and does not request transmitting any uplink signals using the first carrier or the second carrier within the time interval T before transmitting the next uplink signal.

2.6. Configuration Case 6

In a first case of where the terminal is in the first transmission method, according to the scheduling information of the base station, if the terminal sends an uplink signal on carrier 2 at the next transmission occasion, then the terminal, in some embodiments, does not request transmitting any uplink signals using carrier 1 or carrier 2 within a time interval T before transmitting the next uplink signal. In a second case where the terminal is in the second transmission method, according to the scheduling information of the base station, if the terminal will send an uplink signal on carrier 1 at the next transmission occasion, then the terminal, in some embodiments, does not request transmitting any uplink signals using carrier 1 or carrier 2 within the time interval T before transmitting the next uplink signal. The time interval T is used for UE to switch the transmission method. For example, if the wireless communication device is currently using the first transmission method, and based on the scheduling information, the wireless communication device determines to transmit a next uplink signal on a next transmission occasion on the second carrier (e.g., carrier 2), then the wireless communication device may: switch to the second transmission method, and does not request transmitting any uplink signals using the first carrier (e.g., carrier 1) or the second carrier within a time interval T before transmitting the next uplink signal. As another example, if the wireless communication device determines the wireless communication device is currently using the second transmission method, and based on the scheduling information, the wireless communication device determines to transmit the next uplink signal on the next transmission occasion on the first carrier, then the wireless communication device may: switch to the first transmission method, and does not request transmitting any uplink signals using the first carrier or the second carrier within the time interval T before transmitting the next uplink signal.

2.6.1. Example Embodiment(s)

The base station may, in some embodiments, configure two uplink carriers for the terminal through RRC signaling, that is, carrier 1 and carrier 2. The terminal may include two transmission methods, namely the first transmission method and the second transmission method.

The terminal may, in some embodiments, contain two sets of RF chain in total. When the terminal is in the first transmission method, one set of radio frequency chain may be reserved for carrier 1 to send uplink signals, and the other set is reserved for carrier 2. When the terminal is in the second transmission method, both sets of radio frequency chain of the terminal may be reserved for carrier 2 to send uplink signals. When the transmission method is switched, the radio frequency chain of the terminal may, in some embodiments, need to be switched accordingly. Specifically, when the terminal switches from the first transmission method to the second transmission method, the terminal may, in some embodiments, need to switch a set of radio frequency chain reserved for carrier 1 to carrier 2. When the terminal switches from the second transmission method to the first transmission method, the terminal may, in some embodiments, need to switch a set of radio frequency chain reserved for carrier 2 to carrier 1. When the radio frequency chain is switched, the terminal may, in some embodiments, need a certain radio frequency switching time. During this switching time, then the terminal, in some embodiments, does not request (e.g., refrains from) to send uplink signals on carrier 1 and carrier 2, in some embodiments. The switching time here may be T, where T>=0.

Figure 3:
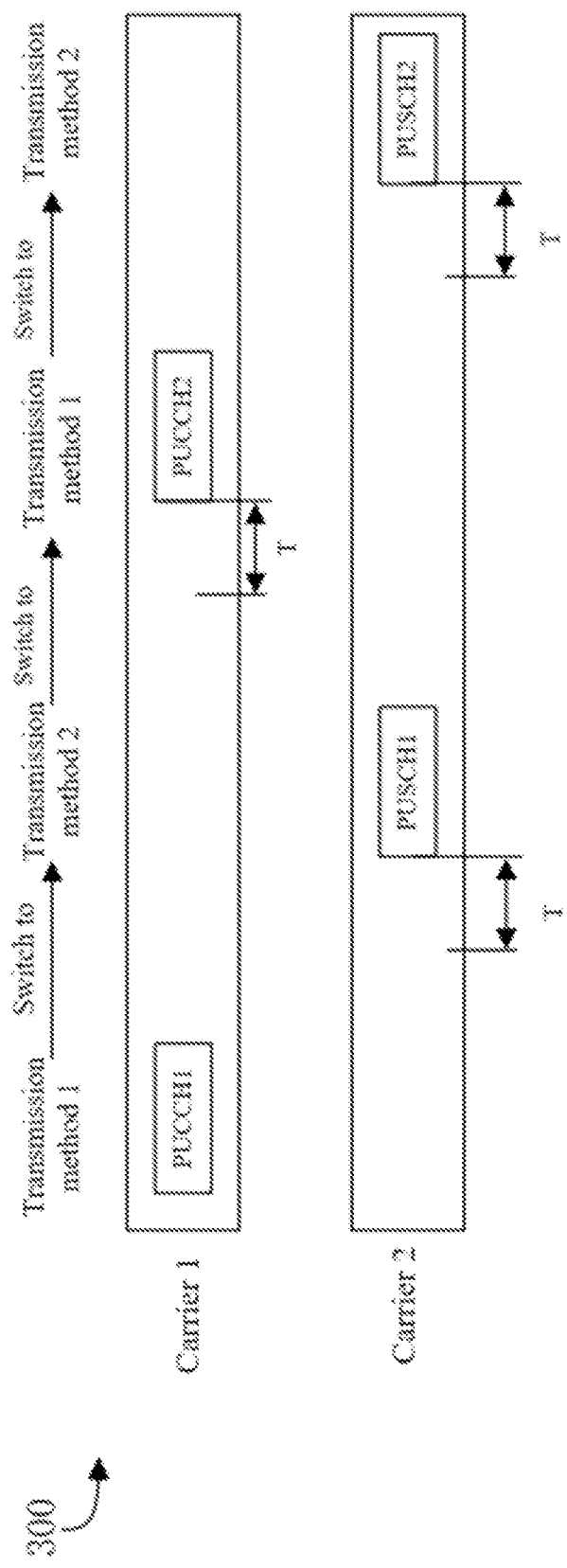
FIG. 3 illustrates a block diagram of an example transmission of single-port and/or dual-port uplink signals on carrier 1 and carrier 2, in accordance with some embodiments of the present disclosure.

FIG. 3 illustrates a block diagram of an example transmission of single-port and/or dual-port uplink signals on carrier 1 and carrier 2, in accordance with some embodiments of the present disclosure. As shown in FIG. 3, at the beginning, the terminal may send a PUCCH (shown in FIG. 3 as, "PUCCH1") on the carrier 1 (sometimes referred to as, "a first carrier"). The terminal may use one antenna port to send the PUCCH. At this time, the terminal may be in the first transmission method and the terminal may reserve one radio frequency chain for carrier 1 and carrier 2 respectively. The terminal may receive the scheduling information via DCI from the base station, and the scheduling information instructs the terminal to send a PUSCH (shown in FIG. 3, PUSCH1) on the carrier 2 (sometimes referred to as, "a second carrier") at the next transmission occasion. In order to prepare to transmit PUSCH1 on carrier 2, the terminal may switch from the first transmission method to the second transmission method, that is, reserve two sets of radio frequency chain for carrier 2. The T time in front of PUSCH1 may be used by the terminal to switch the radio frequency chain. During this switching time, then the terminal, in some embodiments, does not request to send uplink signals on carrier 1 and carrier 2.

After that, the terminal may receive the scheduling information via DCI from the base station, and the scheduling information instructs the terminal to send a PUCCH (denoted as PUCCH2) on the carrier 1 at the next transmission occasion. At this time, the terminal may be in the second transmission method, both radio frequency chain may be reserved for carrier 2. In order to prepare to send PUCCH2 on carrier 1, the terminal may switch from the second transmission method to the first transmission method, which is to switch one of the RF chains reserved for carrier 2 to carrier 1. The T time before PUCCH2 is used by the terminal to switch the radio frequency chain. During this switching time, then the terminal, in some embodiments, does not request to send uplink signals on carrier 1 and carrier 2.

Similarly, the terminal may receive the scheduling information via DCI from the base station, and the scheduling information instructs the terminal to send a PUSCH (denoted as PUSCH2) on the carrier 2 at the next transmission timing. At this time, the terminal may switch from the first transmission method to the second transmission method.

According to different scheduling information, a single-port uplink signal or a dual-port uplink signal may be transmitted on carrier 2. In this embodiment, the terminal, in some embodiments, does not need to determine whether a single-port uplink signal or a dual-port uplink signal is scheduled on carrier 2. As long as the scheduling information instructs the terminal to send an uplink signal on carrier 2, the terminal switches to the second transmission method. This may help simplify the implementation of the terminal.

2.7. Configuration Case 7

In a first case of where the terminal is in the first transmission method, according to the scheduling information of the base station, if the terminal will send a dual-port uplink signal on the carrier 2 at the next transmission occasion, then the terminal does not request transmitting any uplink signals using carrier 1 or carrier 2 within a time interval T before transmitting the dual-port uplink signal. In a second case where the terminal is in the second transmission method, according to the scheduling information of the base station, if the terminal will send a next uplink signal on carrier 1 at the next transmission occasion, then the terminal does not request transmitting any uplink signals using carrier 1 or carrier 2 within the time interval T before transmitting the next uplink signal. The time interval T is used for UE to switch the transmission method. For example, if the wireless communication device determines that the wireless communication device is currently using the first transmission method, and based on the scheduling information, the wireless communication device determines to transmit a dual-port uplink signal on a next transmission occasion on the second carrier, then the wireless communication device may: switch to the second transmission method, and does not request transmitting any uplink signals using the first carrier or the second carrier within a time interval T before transmitting the dual-port uplink signal. As another example, if the wireless communication device is currently using the second transmission method, and based on the scheduling information, the wireless communication device determines to transmit a next uplink signal on the next transmission occasion on the first carrier, then the wireless communication device may: switch to the first transmission method, and does not request transmitting any uplink signals using the first carrier or the second carrier within the time interval T before transmitting the next uplink signal.

2.7.1. Example Embodiment(s)

The terminal may, in some embodiments, contain two sets of RF chain in total. When the terminal is in the first transmission method, one set of radio frequency chain may be reserved for carrier 1 to send uplink signals, and the other set is reserved for carrier 2. When the terminal is in the second transmission method, both sets of radio frequency chain of the terminal may be reserved for carrier 2 to send uplink signals. When the transmission method is switched, the radio frequency chain of the terminal may need to be switched accordingly. Specifically, when the terminal switches from the first transmission method to the second transmission method, the terminal may need to switch a set of radio frequency chain reserved for carrier 1 to carrier 2. When the terminal switches from the second transmission method to the first transmission method, the terminal may need to switch a set of radio frequency chain reserved for carrier 2 to carrier 1. When the radio frequency chain is switched, the terminal may need a certain switching time.

During this switching time, then the terminal, in some embodiments, does not request to send uplink signals on carrier 1 and carrier 2. The switching time may be T, where T>=0. That is, the terminal does not request transmitting any uplink signals using carrier 1 or carrier 2 within the time internal T.

Figure 4:
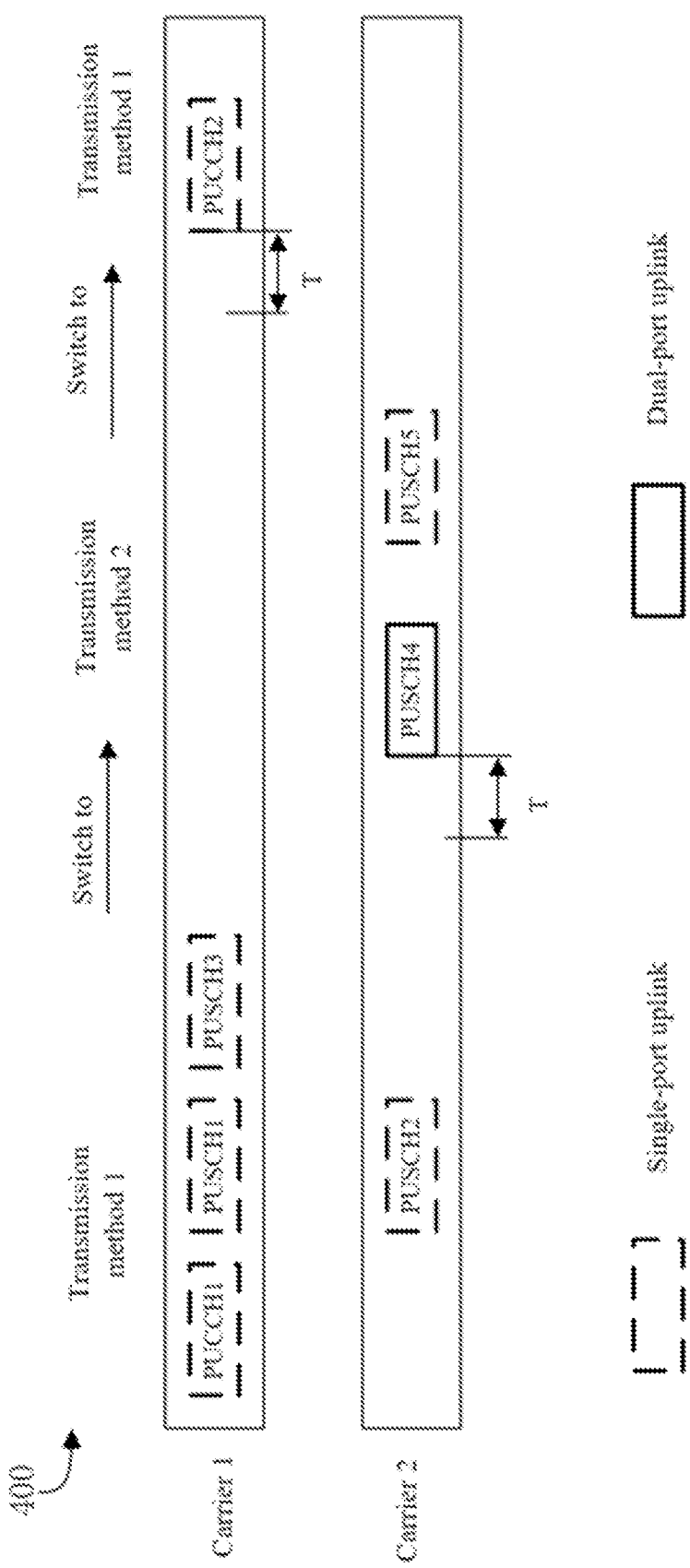
FIG. 4 illustrates a block diagram of an example transmission of single-port and/or dual-port uplink signals on carrier 1 and carrier 2, in accordance with some embodiments of the present disclosure.

FIG. 4 illustrates a block diagram of an example transmission of single-port and/or dual-port uplink signals on carrier 1 and carrier 2, in accordance with some embodiments of the present disclosure. As shown in FIG. 4, at the beginning, the terminal may send a PUCCH (shown in FIG. 4 as, PUCCH1) on the carrier 1. The terminal may use one antenna port to send the PUCCH1. At this time, the terminal may be in the first transmission method. The terminal may receive the scheduling information via DCI from the base station, and the scheduling information instructs the terminal to simultaneously send a single-port PUSCH (corresponding to PUSCH1 and PUSCH2, respectively) on carrier 1 and carrier 2 at the next transmission occasion. Because the terminal is in the first transmission method, the terminal may use the radio chain of carrier 1 and carrier 2 to send their respective single-port uplink signals so the terminal may continue to stay in the first transmission method without switching the transmission method.

The terminal may receive the scheduling information via DCI from the base station, and the scheduling information instructs the terminal to send a PUSCH (shown in FIG. 4 as, PUSCH3) on the carrier 1 at the next transmission timing. Similarly, at this time, the terminal may be in the first transmission method, and the terminal may reserve one radio frequency chain for carrier 1 and carrier 2. The terminal may use the radio frequency chain of carrier 1 to send PUSCH3, so the terminal may continue to stay in the first transmission method without switching the transmission method.

The terminal may receive the scheduling information via DCI from the base station, and the scheduling information instructs the terminal to send a dual-port PUSCH (shown in FIG. 4 as, PUSCH4) on the carrier 2 at the next transmission occasion. Because the terminal is in the first transmission method, the terminal may reserve a set of radio frequency chain for carrier 1 and carrier 2 respectively, and the terminal cannot send a dual-port uplink signal (PUSCH4) using only one set of radio frequency chain on carrier 2. Therefore, the terminal may switch from the first transmission method to the second transmission method, that is, the radio frequency chain reserved for carrier 1 may be switched to carrier 2. The T time before PUSCH4 may be used by the terminal to switch the radio frequency chain. During this switching time, in some embodiments, the terminal does not request to send uplink signals on carrier 1 and carrier 2.

The terminal may receive the scheduling information via DCI from the base station, and the scheduling information instructs the terminal to send a single-port PUSCH (denoted as PUSCH5) on the carrier 2 at the next transmission timing. Because the terminal is in the second transmission method at this time, the terminal may reserve two sets of radio frequency chain for carrier 2. At this time, the terminal may use one set of radio frequency chain of carrier 2 to send PUSCH5. At this time, the terminal may remain in the second transmission method without switching the transmission method.

The terminal may receive the scheduling information via DCI from the base station, instructing the terminal to send a PUCCH (denoted as PUCCH2) on the carrier 1 at the next transmission occasion. Because the terminal is in the second transmission method at this time, the terminal may reserve two sets of radio frequency chain for carrier 2 and does not, in some embodiments, reserve the radio frequency chain for carrier 1. The terminal may switch from the second transmission method to the first transmission method. A set of RF chain is switched to carrier 1 from carrier 2. The T time before PUCCH2 may be used by the terminal to switch the radio frequency chain. During this switching time, in some embodiments, the terminal does not request to send uplink signals on carrier 1 and carrier 2.

2.8. Configuration Case 8

When T corresponds to carrier 1 (e.g., is on carrier 1), in some embodiments, if the terminal is in the first transmission method before an uplink phase, according to the scheduling information of the base station, if the terminal will send an uplink signal on carrier 2 in the uplink phase, then the terminal, in some embodiments, does not require that uplink signals are sent on carrier 1 and carrier 2 within the time internal T before the start of the uplink phase.

When T corresponds to carrier 1, in some embodiments, if the terminal is in the second transmission method before an uplink phase, according to the scheduling information of the base station, if the terminal will send an uplink signal on carrier 1 during the uplink phase, then the terminal does not request transmitting any uplink signals using carrier 1 or carrier 2 within the time internal T before the start of the uplink phase When T corresponds to carrier 1, in some embodiments, if the terminal is in a second transmission method in an uplink phase, according to the scheduling information of the base station, if the terminal will send an uplink signal on carrier 1 after the uplink phase, then the terminal, in some embodiments, does not request transmitting any uplink signals using carrier 1 or carrier 2 within the time internal T after the end of the uplink phase.

When T corresponds to carrier 2 (e.g., is on carrier 2), in some embodiments, if the terminal is in the first transmission method before an uplink phase, according to the scheduling information of the base station, if the terminal will send an uplink signal on carrier 2 during the uplink phase, then the terminal, in some embodiments, does not request transmitting any uplink signals using carrier 1 or carrier 2 within the time internal T after the start of the uplink phase.

When T corresponds to carrier 2, in some embodiments, if the terminal is in the second transmission method before an uplink phase, according to the scheduling information of the base station, if the terminal will send an uplink signal on carrier 1 during the uplink phase, then the terminal, in some embodiments, does not request transmitting any uplink signals using carrier 1 or carrier 2 within the time internal T after the start of the uplink phase.

When T corresponds to carrier 2, in some embodiments, if the terminal is in the second transmission method in an uplink phase, according to the scheduling information of the base station, if the terminal will send an uplink signal on carrier 1 after the uplink phase, then the terminal, in some embodiments, does not request transmitting any uplink signals using carrier 1 or carrier 2 within the time internal T after the end of the uplink phase.

2.8.1. Example Embodiment(s)

The base station may, in some embodiments, configure two uplink carriers for the terminal through RRC signaling, that is, carrier 1 and carrier 2. The terminal may include two transmission methods, namely the first transmission method and the second transmission method.

The terminal contains two sets of RF chain in total. When the terminal is in the first transmission method, one set of radio frequency chain may be reserved for carrier 1 to send uplink signals, and the other set may be reserved for carrier 2. When the terminal is in the second transmission method, both sets of radio frequency chain of the terminal maybe reserved for carrier 2 to send uplink signals. When the transmission method is switched, the radio frequency chain of the terminal may need to be switched accordingly. Specifically, when the terminal switches from the first transmission method to the second transmission method, the terminal may need to switch a set of radio frequency chain reserved for carrier 1 to carrier 2. When the terminal switches from the second transmission method to the first transmission method, the terminal may need to switch a set of radio frequency chain reserved for carrier 2 to carrier 1. When the radio frequency chain is switched, the terminal may need a certain switching time. During this switching time, in some embodiments, the terminal does not request to send uplink signals on carrier 1 and carrier 2. The switching time may be T, where T>=0. That is, the terminal does not request transmitting any uplink signals using carrier 1 or carrier 2 within the time internal T.

The uplink phase may be defined as a continuous uplink symbol on carrier 2. The uplink phase may be indicated by an RRC parameter. By introducing an uplink phase and limiting the location of the RF switching time, it is possible to ensure that the terminal does not switch the transmission method within an uplink phase, thereby avoiding the terminal frequently switching the transmission method, and improving the transmission efficiency of the system.

The base station can, in some embodiments, configure the radio frequency switching time T on the carrier 1 or the carrier 2 through the RRC parameter, or can specify that the radio frequency switching time T is on the carrier 2 through a protocol.

Figure 5:
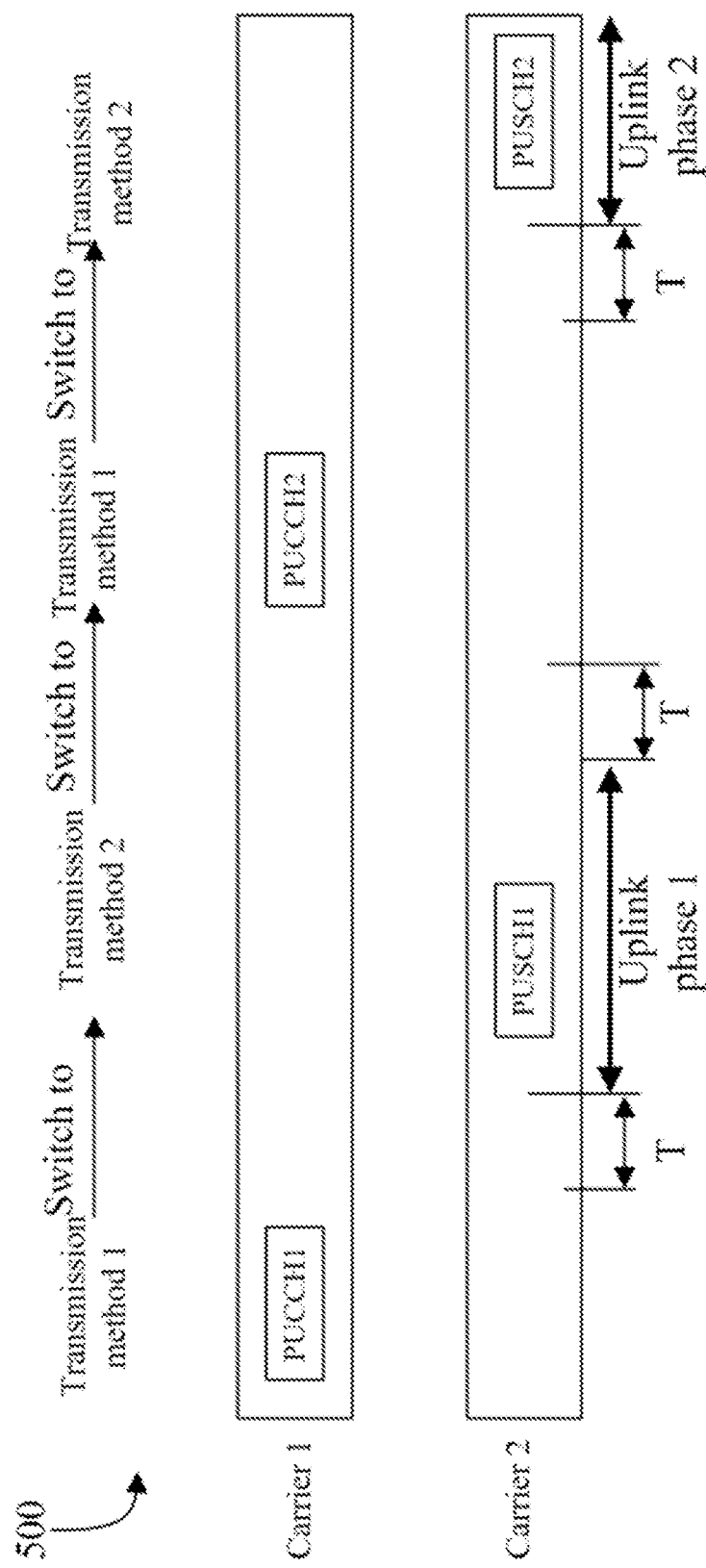
FIG. 5 illustrates a block diagram of an example transmission of single-port and/or dual-port uplink signals on carrier 1 and carrier 2, where T corresponds to carrier 1, in accordance with some embodiments of the present disclosure.

FIG. 5 illustrates a block diagram of an example transmission of single-port and/or dual-port uplink signals on carrier 1 and carrier 2, where T corresponds to carrier 1, in accordance with some embodiments of the present disclosure. As shown in FIG. 5, at the beginning, the terminal may send a PUCCH (shown in FIG. 5 as, PUCCH1) on the carrier 1. The terminal may use one antenna port to send the PUCCH1. At this time, the terminal is in the first transmission method and the terminal may reserve one radio frequency chain for carrier 1 and carrier 2 respectively. The terminal may receive the scheduling information via DCI from the base station, and the scheduling information instructs the terminal to send a PUSCH (denoted as PUSCH1) on the carrier 2 in the uplink phase 1. In order to prepare to transmit PUSCH 1 on carrier 2, the terminal may switch from the first transmission method to the second transmission method, that is, the RF chain reserved for carrier 1 may be switched to carrier 2. The time T before the uplink phase 1 may be used by the terminal to switch the radio frequency chain. During this switching time, in some embodiments, the terminal does not request to send uplink signals on carrier 1 and carrier 2.

The terminal may receive the scheduling information via DCI from the base station, and the scheduling information instructs the terminal to send a PUCCH (denoted as PUCCH2) on the carrier 1 after the uplink phase 1. At this time, the terminal is in the second transmission method and both radio frequency chain may be reserved for carrier 2. In order to prepare to send PUCCH2 on carrier 1, the terminal may switch from the second transmission method to the first transmission method, which is to switch one of two sets of RF chains reserved for carrier 2 to carrier 1. The T time after the uplink phase 1 may be used for the terminal to switch the radio frequency chain. During this switching time, in some embodiments, the terminal does not request to send uplink signals on carrier 1 and carrier 2.

Similarly, the terminal may receive the scheduling information via DCI from the base station, and the scheduling information instructs the terminal to send a PUSCH (denoted as PUSCH2) on the carrier 2 in the uplink phase 2, and the terminal switches from the first transmission method to the second transmission method. The T time before the uplink phase 2 may be used by the terminal to switch the radio frequency chain. During this switching time, in some embodiments, the terminal does not request to send uplink signals on carrier 1 and carrier 2.

In this embodiment, the system may limit the radio frequency switching time before or after the uplink phase, which can ensure that the terminal does not switch the transmission method during the uplink phase, thereby preventing the terminal from frequently switching the transmission methods, and improving the transmission efficiency of the system.

Figure 6:
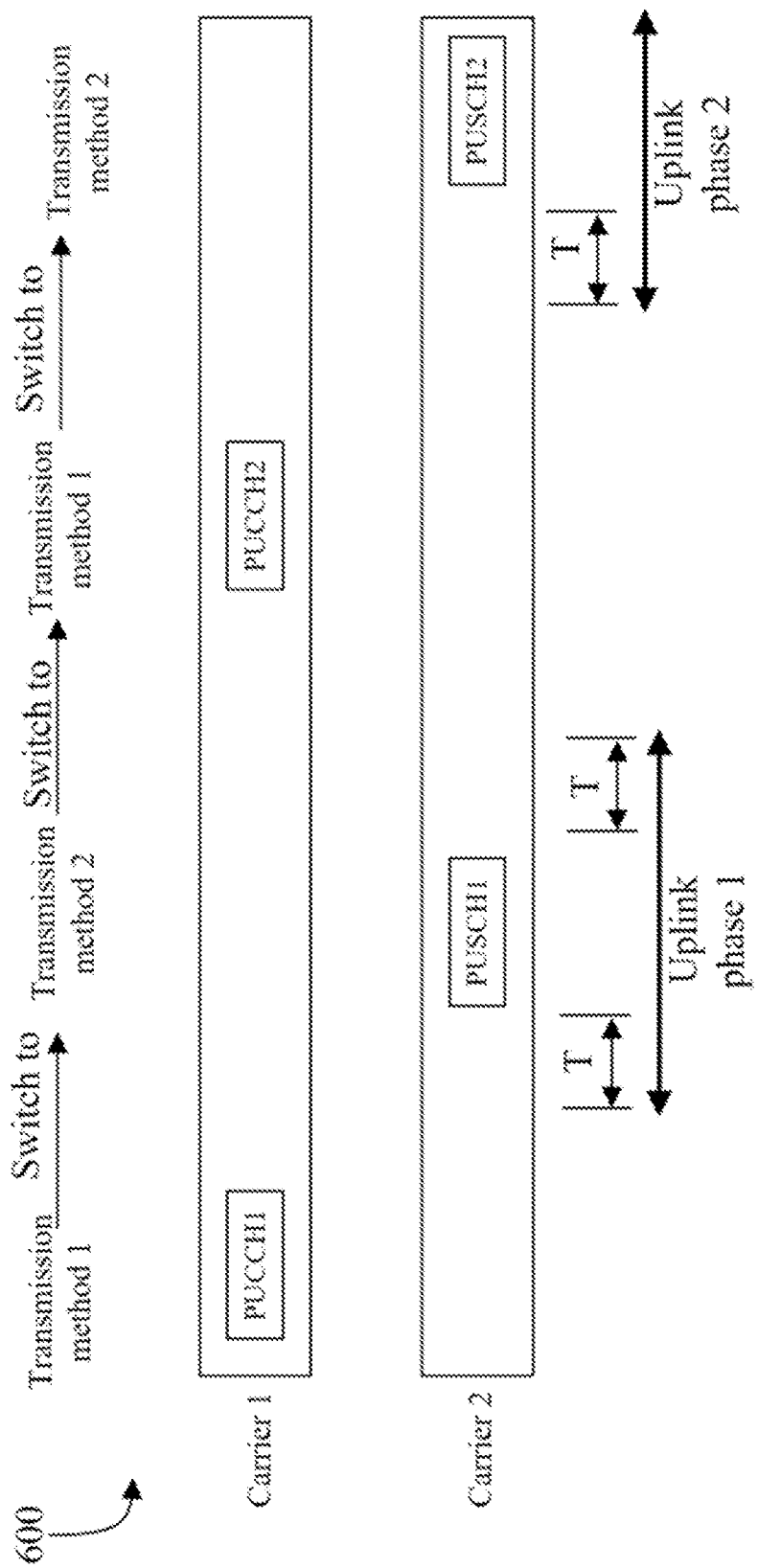
FIG. 6 illustrates a block diagram of an example transmission of single-port and/or dual-port uplink signals on carrier 1 and carrier 2, where T corresponds to carrier 2, in accordance with some embodiments of the present disclosure.

FIG. 6 illustrates a block diagram of an example transmission of single-port and/or dual-port uplink signals on carrier 1 and carrier 2, where T corresponds to carrier 2, in accordance with some embodiments of the present disclosure. As shown in FIG. 6, at the beginning, the terminal may send a PUCCH (shown in FIG. 6 as, PUCCH1) on the carrier 1. The terminal may use one antenna port to send the PUCCH. At this time, the terminal is in the first transmission method and the terminal may reserve one radio frequency chain for carrier 1 and carrier 2 respectively. The terminal may receive the scheduling information via DCI from the base station, and instructs the terminal to send a PUSCH (denoted as PUSCH1) on the carrier 2 in the uplink phase 1. In order to prepare to transmit PUSCH 1 on carrier 2, the terminal may switch from the first transmission method to the second transmission method, that is, the RF chain of carrier 1 is switched to carrier 2. The T time after the start of the uplink phase 1 may be used for the terminal to switch the radio frequency chain. During this switching time, in some embodiments, the terminal does not request to send uplink signals on the carrier 1 and the carrier 2.

The terminal may receive the scheduling information via DCI from the base station, and the scheduling information instructs the terminal to send a PUCCH (denoted as PUCCH2) on the carrier 1 after the uplink phase 1. At this time, the terminal is in the second transmission method and both sets of radio frequency chain may be reserved for carrier 2. In order to prepare to send PUCCH2 on carrier 1, the terminal may switch from the second transmission method to the first transmission method, which is to switch one of the two sets of RF chains for carrier 2 to carrier 1. The T time before the end of the uplink phase 1 may be used for the terminal to switch the radio frequency chain. During this switching time, in some embodiments, the terminal does not request to send uplink signals on carrier 1 and carrier 2.

Similarly, the terminal may receive the scheduling information via DCI from the base station, and the scheduling information instructs the terminal to send a PUSCH (denoted as PUSCH2) on the carrier 2 in the uplink phase 2. In order to prepare uplink transmission on carrier 2, the terminal switches from the first transmission method to the second transmission method. The T time after the start of uplink phase 2 may be used by the terminal to switch the radio frequency chain. During this switching time, in some embodiments, the terminal does not request to send uplink signals on carrier 1 and carrier 2.

In this embodiment, the system may limit the radio frequency switching time before or after the uplink phase, which can ensure that the terminal does not switch the transmission method during the uplink phase, thereby preventing the terminal from frequently switching the transmission methods, and improving the transmission efficiency of the system.

2.9. Configuration Case 9

When T is on carrier 1, in some embodiments, if the terminal is in the first transmission method before an uplink phase, according to the scheduling information of the base station, if the terminal will send a dual-port uplink signal on carrier 2 during the uplink phase, then the terminal, in some embodiments, does not request transmitting any uplink signals using the first carrier or the second carrier within the time internal T before the start of the uplink phase.

When T is on carrier 1, in some embodiments, if the terminal is in the second transmission method before an uplink phase, according to the scheduling information of the base station, if the terminal will send an uplink signal on carrier 1 during the uplink phase, then the terminal, in some embodiments, does not require transmitting any uplink signals any using the first carrier or the second carrier within the time internal T before the start of the uplink phase.

When T is on carrier 1, in some embodiments, if the terminal is in the second transmission method in an uplink phase, according to the scheduling information of the base station, if the terminal will send an uplink signal on carrier 1 after the uplink phase, then the terminal does not request transmitting any uplink signals using the first carrier or the second carrier within the time internal T after the end of the uplink phase.

When T is on carrier 2, in some embodiments, if the terminal is in the first transmission method before an uplink phase, according to the scheduling information of the base station, if the terminal will send a dual-port uplink signal on carrier 2 during the uplink phase, then the terminal does not request transmitting any uplink signals using the first carrier or the second carrier within the time internal T after the start of the uplink phase.

When T is on carrier 2, in some embodiments, if the terminal is in the second transmission method before an uplink phase, according to the scheduling information of the base station, if the terminal will send an uplink signal on carrier 1 during the uplink phase, the terminal does not request transmitting any uplink signals using the first carrier or the second carrier within the time internal T after the start of the uplink phase.

When T is on carrier 2, in some embodiments, if the terminal is in the second transmission method in an uplink phase, according to the scheduling information of the base station, if the terminal will send an uplink signal on carrier 1 after the uplink phase, then the terminal does not request transmitting any uplink signals using the first carrier or the second carrier within the time internal T after the end of the uplink phase.

2.9.1. Example Embodiment(s)

The base station may, in some embodiments, may configure two uplink carriers for the terminal through RRC signaling, that is, carrier 1 and carrier 2. The terminal may include two transmission methods, namely the first transmission method and the second transmission method.

The terminal may contain two sets of RF chain in total. When the terminal is in the first transmission method, one set of radio frequency chain is reserved for carrier 1 to send uplink signals, and the other set is reserved for carrier 2. When the terminal is in the second transmission method, both sets of radio frequency chain of the terminal are reserved for carrier 2 to send uplink signals. When the transmission method is switched, the radio frequency chain of the terminal needs to be switched accordingly. Specifically, when the terminal switches from the first transmission method to the second transmission method, the terminal needs to switch a set of radio frequency chain reserved for carrier 1 to carrier 2. When the terminal switches from the second transmission method to the first transmission method, the terminal needs to switch a set of radio frequency chain reserved for carrier 2 to carrier 1. When the radio frequency chain is switched, the terminal needs a certain switching time. During this switching time, in some embodiments, the terminal does not request to send uplink signals on carrier 1 and carrier 2. The switching time may be T, where T>=0. That is, the terminal does not request transmitting any uplink signals using the first carrier or the second carrier within the time internal T.

The uplink phase may be defined as a continuous uplink symbol on carrier 2. The uplink phase may be indicated by an RRC parameter. By introducing an uplink phase and limiting the location of the RF switching time, it is possible to ensure that the terminal does not switch the transmission method within an uplink phase, thereby avoiding the terminal frequently switching the transmission method, and improving the transmission efficiency of the system.

The base station can configure the radio frequency switching time T on the carrier 1 or the carrier 2 through the RRC parameter, or can specify that the radio frequency switching time T is on the carrier 2 through a protocol.

Figure 7:
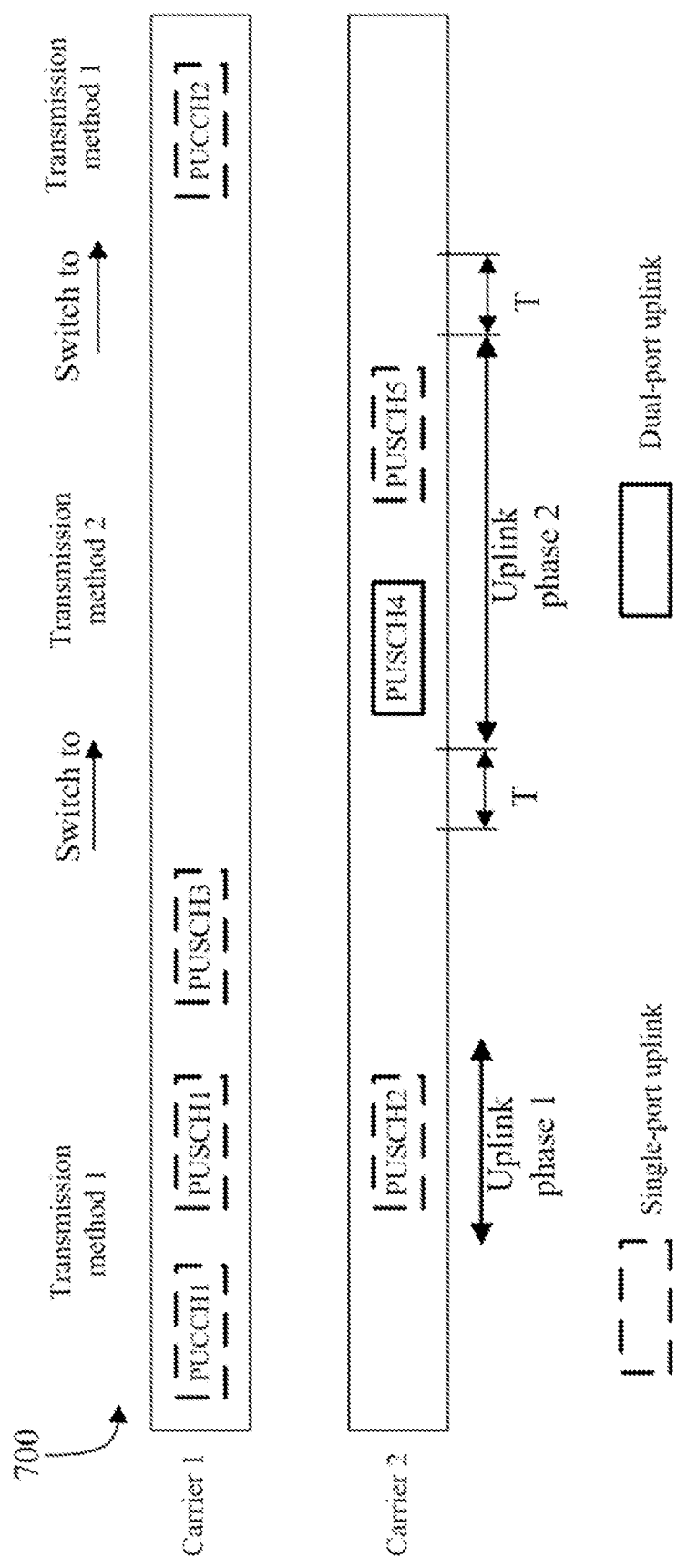
FIG. 7 illustrates a block diagram of an example transmission of single-port and/or dual-port uplink signals on carrier 1 and carrier 2, where T corresponds to carrier 1, in accordance with some embodiments of the present disclosure.

FIG. 7 illustrates a block diagram of an example transmission of single-port and/or dual-port uplink signals on carrier 1 and carrier 2, where T corresponds to carrier 1, in accordance with some embodiments of the present disclosure. As shown in FIG. 7, at the beginning, the terminal may send a PUCCH (shown in FIG. 7 as, PUCCH1) on the carrier 1. The terminal may use one antenna port to send the PUCCH. At this time, the terminal is in the first transmission method and the terminal may reserve one radio chain for carrier 1 and carrier 2 respectively. The terminal may receive the scheduling information via DCI from the base station, and the scheduling information instructs the terminal to simultaneously send a single-port PUSCH (corresponding to PUSCH1 and PUSCH2, respectively) on carrier 1 and carrier 2 in uplink phase 1. The terminal can use the set of radio frequency chain of carrier 1 and carrier 2 to send their respective single-port uplink signals. So the terminal continues to stay in the first transmission method without switching the transmission method, and there is no need to reserve radio frequency switching time before uplink phase 1.

The terminal may receive the scheduling information via DCI from the base station, and the scheduling information instructs the terminal to send a PUSCH (denoted as PUSCH3) on the carrier 1 after the uplink phase 1. Similarly, at this time, the terminal is in the first transmission method, and the terminal reserves one radio frequency chain for carrier 1 and carrier 2 respectively. Terminal can use the set of the radio frequency chain of carrier 1 to send PUSCH 3, so the terminal continues to stay in the first transmission method without switching the transmission method, which eliminates the need to reserve radio frequency switching time after uplink phase 1.

The terminal may receive the scheduling information via DCI from the base station, and the scheduling information instructs the terminal to send a dual-port PUSCH (denoted as PUSCH4) on the carrier 2 in the uplink phase 2. Because the terminal is in the first transmission method, the terminal may reserve a radio frequency chain for carrier 1 and carrier 2 respectively, and the terminal cannot send a dual-port uplink signal (PUSCH4) using a set of radio frequency chain on carrier 2. Therefore, the terminal may need to switch to the second transmission method, that is, the set of radio frequency chain reserved for carrier 1 is switched to carrier 2. The T time before the uplink phase 2 may be used by the terminal to switch the radio frequency chain. During this switching time, in some embodiments, the terminal does not request to send uplink signals on carrier 1 and carrier 2.

The terminal may receive the scheduling information via DCI from the base station, and the scheduling information instructs the terminal to send a single-port PUSCH (denoted as PUSCH5) on the carrier 2 at the next transmission occasion. Because the terminal is in the second transmission method at this time, the terminal may reserve two sets of radio frequency chain for carrier 2. At this time, the terminal can use one set of radio frequency chain of carrier 2 to send PUSCH5. At this time, the terminal may remain in the second transmission method without switching the transmission method.

The terminal may receive the scheduling information via DCI from the base station, instructing the terminal to send a PUCCH (denoted as PUCCH2) on the carrier 1 after the uplink phase 2. Because the terminal is in the second transmission method at this time, the terminal may reserve two sets of radio frequency chain for carrier 2 and does not reserve the radio frequency chain for carrier 1. The terminal may switch from the second transmission method to the first transmission method. A set of RF chain is switched from carrier 2 to carrier 1. The T time after the uplink phase is used by the terminal to switch the radio frequency chain. During this switching time, in some embodiments, the terminal does not request to send uplink signals on carrier 1 and carrier 2.

Figure 8:
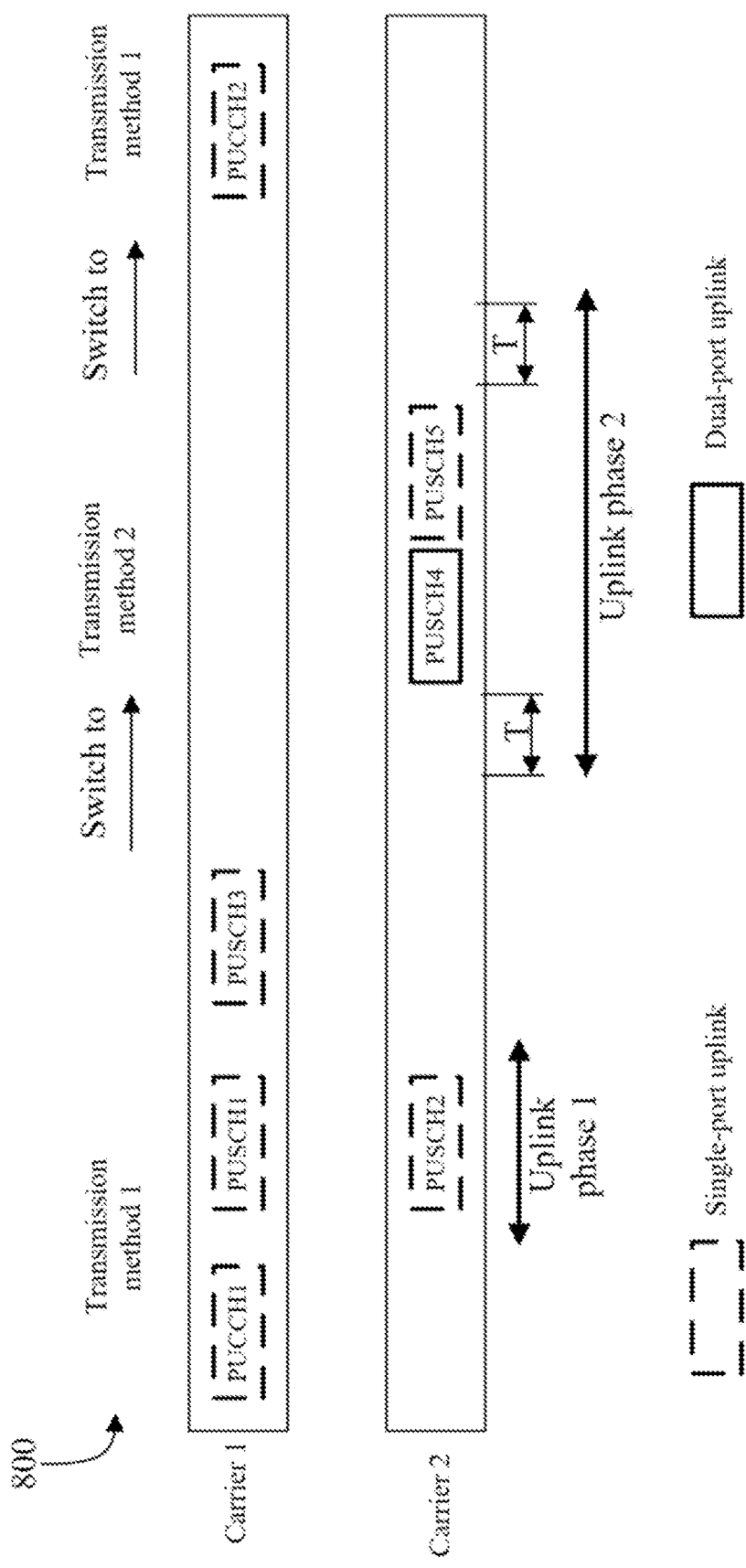
FIG. 8 illustrates a block diagram of an example transmission of single-port and/or dual-port uplink signals on carrier 1 and carrier 2, where T corresponds to carrier 2, in accordance with some embodiments of the present disclosure.

FIG. 8 illustrates a block diagram of an example transmission of single-port and/or dual-port uplink signals on carrier 1 and carrier 2, where T corresponds to carrier 2, in accordance with some embodiments of the present disclosure. As shown in FIG. 8, at the beginning, the terminal may send a PUCCH (shown in FIG. 8 as, PUCCH1) on the carrier 1. The terminal may use one antenna port to send the PUCCH. At this time, the terminal is in the first transmission method and the terminal may reserve one radio link for each of carrier 1 and carrier 2. The terminal may receive the scheduling information via DCI from the base station, and the scheduling information instructs the terminal to simultaneously send a single-port PUSCH (corresponding to PUSCH1 and PUSCH2, respectively) on carrier 1 and carrier 2 in uplink phase 1. The terminal can use the radio links of carrier 1 and carrier 2 to send their respective single-port uplink signals. So the terminal may continue to stay in the first transmission method without switching the transmission method, and there is no need to reserve radio frequency switching time after uplink phase 1 starts.

The terminal may receive the scheduling information via DCI from the base station, and the scheduling information instructs the terminal to send a PUSCH (denoted as PUSCH3) on the carrier 1 after the uplink phase 1. Similarly, at this time, the terminal is in the first transmission method, and the terminal reserves one radio frequency chain for carrier 1 and carrier 2 respectively. Terminal can use the radio frequency chain of carrier 1 to send PUSCH 3, so the terminal continues to stay in the first transmission method without the switching the transmission method, which eliminates the need to reserve radio frequency switching time before the end of uplink phase 1.

The terminal may receive the scheduling information via DCI from the base station, and the scheduling information instructs the terminal to send a dual-port PUSCH (denoted as PUSCH4) on the carrier 2 in the uplink phase 2. Because the terminal is in the first transmission method, the terminal may reserve a radio frequency chain for carrier 1 and carrier 2, and the terminal cannot send a dual-port uplink signal (PUSCH4) using a set of radio frequency chain on carrier 2. Therefore, the terminal may need to switch to the second transmission method, that is, the radio frequency chain reserved for carrier 1 is switched to carrier 2. The T time after the start of the uplink phase 2 may be used for the terminal to switch the radio frequency chain. During this switching time, in some embodiments, the terminal does not request to send uplink signals on carrier 1 and carrier 2.

The terminal may receive the scheduling information via DCI from the base station, and the scheduling information instructs the terminal to send a single-port PUSCH (denoted as PUSCH5) on the carrier 2 at the next transmission occasion. Because the terminal is in the second transmission method at this time, the terminal may reserve two sets of radio frequency chain for carrier 2. At this time, the terminal can use one set of radio frequency chain of carrier 2 to send PUSCH5. At this time, the terminal may remain in the second transmission method without switching the transmission method.

The terminal may receive the scheduling information via DCI from the base station, instructing the terminal to send a PUCCH (denoted as PUCCH2) on the carrier 1 after the uplink phase 2. Because the terminal is in the second transmission method at this time, the terminal may reserve two sets of radio frequency chain for carrier 2 and does not reserve the radio frequency chain for carrier 1. The terminal may switch from the second transmission method to the first transmission method. A set of RF chain reserved for carrier 2 is switched to carrier 1. The T time before the end of the uplink phase is used for the terminal to switch the radio frequency chain. During this switching time, in some embodiments, the terminal does not request to send uplink signals on carrier 1 and carrier 2.

2.10. Configuration Case 10

According to Case 1 (as discussed herein), when the scheduling information of the base station instructs the terminal to send an uplink signal within the radio frequency switching time T, then the terminal, in some embodiments, does not send the uplink signal. In a case where the scheduling information of the base station instructs the terminal to send an uplink signal within the radio frequency switching time T, then the terminal, in some embodiments, sends a part of the uplink signal that is after the end of the radio frequency switching time T.

2.10.1. Example Embodiment(s)

When the terminal switches the transmission method, a radio frequency switching time of T time is required. During the RF switching time, in some embodiments, the terminal does not request to send uplink signals on carrier 1 and carrier 2. However, due to problems such as the design of the base station scheduling algorithm or misalignment of the uplink transmission time, the base station, in some embodiments, cannot completely guarantee that the terminal will not be instructed to send an uplink signal within the radio frequency switching time T.

In the case where the scheduling information of the base station instructs the terminal to send an uplink signal within the radio switching time T, if most of the time of the uplink signal is within the switching time T, then even if the terminal sends the uplink signal, the base station, in some embodiments, cannot successfully receive the uplink signal. At this time, the terminal, in some embodiments, does not send the uplink signal, that is, the terminal may discard the entire uplink signal.

In the case where the scheduling information of the base station instructs the terminal to send an uplink signal within the radio switching time T, if the uplink signal has only a small part of the time within the switching time T, then the terminal may send the uplink signal and the base station has a certain probability of successfully receiving the uplink signal. At this time, the terminal may send the part of uplink signal after the radio frequency switching time T ends, that is, the terminal may discard the uplink signal before the radio frequency switching time T ends.

In a case where the scheduling information of the base station instructs the terminal to send an uplink signal within the radio frequency switching time T, if only a part of the uplink signal is sent, the base station can also receive and use the part of the uplink signal. At this time, the terminal may send the uplink signal after the radio frequency switching time T ends, that is, the terminal may discard the uplink signal before the radio frequency switching time T ends.

Figure 9:
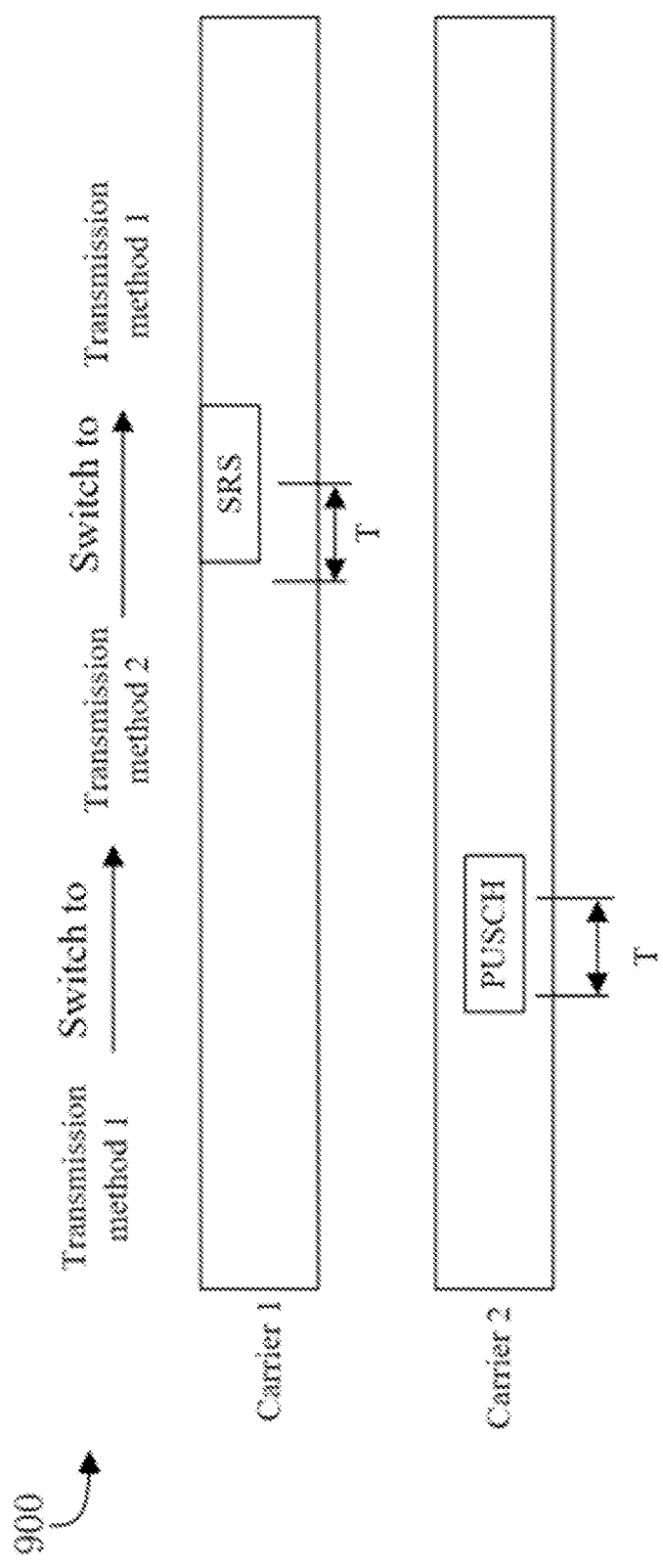
FIG. 9 illustrates a block diagram of an example transmission of single-port and/or dual-port uplink signals on carrier 1 and carrier 2, in accordance with some embodiments of the present disclosure.

FIG. 9 illustrates a block diagram of an example transmission of single-port and/or dual-port uplink signals on carrier 1 and carrier 2, in accordance with some embodiments of the present disclosure. As shown in FIG. 9, during the first radio frequency switching time T, the base station may schedule the terminal to send an uplink signal PUSCH on carrier 2. Because most of PUSCH1 is within the radio frequency switching time T, the terminal, in some embodiments, does not send the PUSCH. Within the second radio frequency switching time T, the base station may schedule the terminal to send an uplink signal SRS on carrier 1. Because even if the terminal only sends part of the SRS that is after the end of the switching time T, the base station can still use part of the SRS for channel state update, etc.

2.11. Configuration Case 11

The UL phase is a slot corresponding to the higher numerology between the numerology of active UL BWP of carrier 1 and the numerology of active UL BWP of carrier 2. If the numerology of active UL BWP of carrier 1 is 0 and the numerology of active UL BWP of carrier 2 is 1, the UL phase is a slot corresponding to numerology 1, which is 0.5 ms in NR system.

The UL phase may be a slot corresponding to the higher numerology between the lowest numerology of active BWPs of carrier 1 and the lowest numerology of active BWPs of carrier 2. Active BWPs of carrier 1 or carrier 2 may include both the active DL BWP and active UL BWP of carrier 1 or carrier 2, respectively.

If the numerology of active UL BWP of carrier 1 is 0 and the numerology of active DL BWP of carrier 1 is 1, then the lowest numerology of active BWPs of carrier 1 may be 0. If the numerology of active UL BWP of carrier 1 is 1 and the numerology of active DL BWP of carrier 1 is 2, then the lowest numerology of active BWPs of carrier 1 may be 1. In this case, the UL phase may be a slot corresponding to numerology 1, which may be 0.5 ms in NR system.

2.12. Configuration Case 12

The UE can be configured with semi-static TDD pattern via higher-layer parameter TDD-UL-DL-Configuration-Common and TDD-UL-DL-ConfigurationDedicated if provided. If all the symbols in a slot are downlink symbols, then the slot can be called as a downlink slot. If all the symbols in a slot are uplink symbols, then the slot can be called as an uplink slot. If at least one of the symbols in a slot is flexible symbol, then the slot can be called as a flexible slot.

For two consecutive slots, if at least one of the two consecutive slots is uplink slot, the radio frequency switch time may be time duration T before the end of the first slot or the time duration T after the start of the second slot.

For a flexible slot, the radio frequency switch time may be time duration T within the flexible symbols in this slot.

2.13. Configuration Case 13

According to Case 1 (as discussed herein), if the terminal wants to send uplink signal 1 in one transmission method and uplink signal 2 in another transmission method, and if the interval between the last symbol of the uplink signal 1 and the first symbol of the uplink signal 2 is less than the radio frequency switching time T, then the terminal, in some embodiments, does not send the uplink signal 2.

2.14. Configuration Case 14

According to Case 13 (as discussed herein), if the terminal wants to send uplink signal 1 in one transmission method and uplink signal 2 in another transmission method, and if the interval between the last symbol of the uplink signal 1 and the first symbol of the uplink signal 2 is less than the radio frequency switching time T and the uplink signal 2 is a terminal-self-transmitted uplink signal, then the terminal, in some embodiments, may send the uplink signal 2.

2.14.1. Example Embodiment(s)

The base station may configure two uplink carriers for the terminal through RRC signaling, that is, carrier 1 and carrier 2. The terminal may include two transmission methods, namely the first transmission method and second transmission method.

The terminal may contain two sets of RF chain in total. When the terminal is in the first transmission method, one set of radio frequency chain may be reserved for carrier 1 to send uplink signals, and the other set is reserved for carrier 2. When the terminal is in the second transmission method, both sets of radio frequency chain of the terminal may be reserved for carrier 2 to send uplink signals. When the transmission method is switched, the radio frequency chain of the terminal, in some embodiments, needs to be switched accordingly. Specifically, when the terminal switches from the first transmission method to the second transmission method, the terminal, in some embodiments, needs to switch a set of radio frequency chain reserved for carrier 1 to carrier 2. When the terminal switches from the second transmission method to the first transmission method, the terminal, in some embodiments, needs to switch a set of radio frequency chain reserved for carrier 2 to carrier 1. When the radio frequency chain is switched, the terminal may need a certain switching time. During this switching time, the terminal, in some embodiments, does not request to send uplink signals on carrier 1 and carrier 2. The switching time, in some embodiments, may be T, where T>=0.

Suppose that the terminal wants to send uplink signal 1 in a first transmission method and uplink signal 2 in a second transmission method, but the interval between the last symbol of uplink signal 1 and the first symbol of uplink signal 2 is less than the radio frequency switching time T, then the terminal may not have enough time to switch to the a second transmission method to send the uplink signal 2, and at this time, the terminal, in some embodiments, does not send the uplink signal 2.

For terminal-self-transmitted uplink signals, the terminal, in some embodiments, needs to be processed with higher priority. The terminal-self-transmitted uplink signal may include at least one of the following signals: a PRACH, an SRS, and a Configured grant PUSCH.

Suppose that the terminal wants to send uplink signal 1 in the first transmission method and uplink signal 2 in the second transmission method, but the interval between the last symbol of uplink signal 1 and the first symbol of uplink signal 2 is less than the radio frequency switching time T, if the uplink signal 2 is PRACH, the priority of the PRACH is higher, and the terminal, in some embodiments, sends the uplink signal 2 at this time. However, in this case, the terminal, in some embodiments, may not necessarily guarantee the transmission of the uplink signal 1.

2.15. Methods for Implementing Configuration Cases 1-14

FIG. 10 is a flow diagram depicting a method for an uplink signal transmission from the perspective of a wireless communication device, in accordance with some embodiments of the present disclosure. Additional, fewer, or different operations may be performed in the method depending on the particular embodiment. In some embodiments, some or all operations of method 1000 may be performed by a wireless communication node, such as BS 102 in FIG. 1. In some operations, some or all operations of method 1000 may be performed by a wireless communication device, such as UE 104 in FIG. 1. Each operation may be re-ordered, added, removed, or repeated.

As shown, the method 1000 includes, in some embodiments, the operation 1002 of supporting, by a wireless communication device, transmitting single-port uplink signals on a first carrier in response to determining that the wireless communication device is in a first transmission method. The method includes, in some embodiments, the operation 1004 of supporting, by the wireless communication device, transmitting the single-port uplink signals or dual-port uplink signals on a second carrier in response to determining that the wireless communication device is in a second transmission method. The method includes, in some embodiments, the operation 1006 of determining, by the wireless communication device based on scheduling information received from a base station, a transmission method used to transmit uplink signals, the transmission method comprises the first transmission method or the second transmission method.

Figure 11:
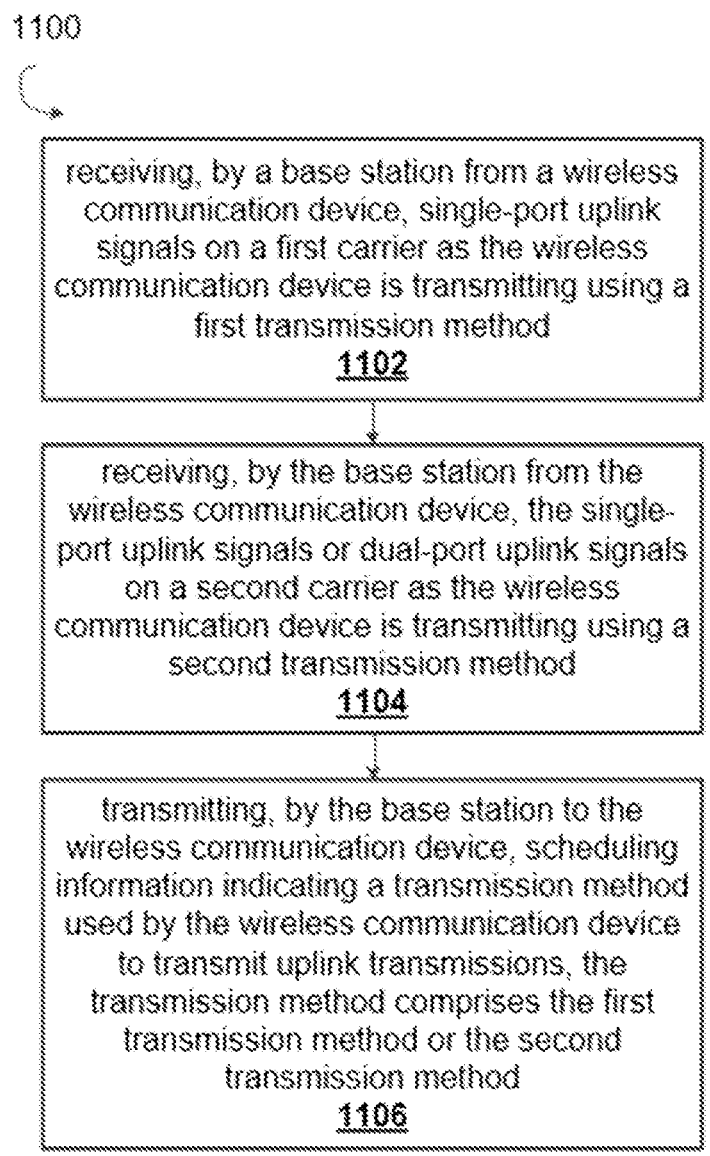
FIG. 11 is a flow diagram depicting a method for managing uplink transmissions from the perspective of a wireless communication node.

FIG. 11 is a flow diagram depicting a method for managing uplink transmissions from the perspective of a wireless communication node, in accordance with some embodiments of the present disclosure. Additional, fewer, or different operations may be performed in the method depending on the particular embodiment. In some embodiments, some or all operations of method 1100 may be performed by a wireless communication node, such as BS 102 in FIG. 1. In some operations, some or all operations of method 1100 may be performed by a wireless communication device, such as UE 104 in FIG. 1. Each operation may be re-ordered, added, removed, or repeated.

As shown, the method 1100 includes, in some embodiments, the operation 1102 of receiving, by a base station from a wireless communication device, single-port uplink signals on a first carrier as the wireless communication device is transmitting using a first transmission method. The method includes, in some embodiments, the operation 1104 of receiving, by the base station from the wireless communication device, the single-port uplink signals or dual-port uplink signals on a second carrier as the wireless communication device is transmitting using a second transmission method. The method includes, in some embodiments, the operation 1106 of transmitting, by the base station to the wireless communication device, scheduling information indicating a transmission method used by the wireless communication device to transmit uplink transmissions, the transmission method comprises the first transmission method or the second transmission method.

3. Reducing Configuration Complexities for a Terminal

This portion of the present disclosure describes various configuration cases for reducing the implementation complexity of configuring a terminal (e.g., UE 104 in FIG. 1) while enabling the terminal to meet the flexibility of the 5G NR configuration of the 5G NR system. Any of the features and/or functions of a configuration case may be combined, in any order, with any number of the features and/or functions of one or more of the other configuration cases.

3.1. Configuration Case 1

As discussed in greater detail herein, a transmission method may include, in some embodiments carrying, by a Physical Downlink Control Channel (PDCCH), Downlink Control Information (DCI), where the DCI indicates terminal status information, and/or transmitting, by a base station, the PDCCH within the first three symbols of a slot. In some embodiments, a transmission method may include carrying DCI, where the DCI indicates terminal status information, and/or receiving, by the terminal from the base station, the PDCCH within the first three symbols of a slot.

3.1.1 Example Embodiment(s)

In the NR system, the base station can, in some embodiments, configure the PDCCH on any symbol of the time slot. The PDCCH may carry DCI, DCI indicates terminal status information, and the terminal determines whether it needs to update its own status according to the terminal status information. For the convenience of description, the present disclosure refers to the DCI indicating the status information of the terminal as the status information DCI. If the PDCCH carries status information DCI and the PDCCH can be configured on any symbol of a time slot, then the terminal, in some embodiments, needs to be ready to update the terminal status at any time, which requires higher implementation complexity of the terminal.

By limiting the position of the PDCCH carrying the state information DCI, the implementation complexity of the terminal, in some embodiments, can be reduced. One method is that the base station may send the PDCCH carrying the status information DCI within the first 3 symbols of the time slot. Another method is that the terminal may receive the PDCCH carrying the status information DCI within the first 3 symbols of the slot. This can not only reduce the implementation complexity of the terminal, but also maintain commonality with the LTE system, and ensure that the NR terminal reuses the design of the LTE terminal to the greatest extent when designing and implementing.

3.2. Configuration Case 2

According to Case 1 (as discussed herein), the terminal status information (as discussed herein) may include at least one of the following: energy saving information (e.g., Power Saving Information); a secondary cell sleep information (e.g., SCell Dormancy Information), and Bandwidth Part (BWP) information

3.2.1 Example Embodiment(s)

The PDCCH carries DCI, DCI indicates terminal status information, and the terminal determines whether it needs to update its own status according to the terminal status information. For the convenience of description, we refer to the DCI indicating the status information of the terminal as the status information DCI.

When the status information indicated by the DCI includes energy saving information, the terminal may determine whether it needs to update its own energy saving state according to the energy saving information indicated by the DCI, such as entering an energy saving state or entering an activated state. If status update is needed, the terminal may require a corresponding update by the RF module or the baseband module. If the DCI carried by the PDCCH indicates energy saving information and the PDCCH can be configured on any symbol of a time slot, then the terminal, in some embodiments, needs to be prepared to update the terminal status at any time, which requires a higher implementation complexity of the terminal.

When the status information indicated by the DCI includes BWP information, the terminal may determine whether it needs to update its BWP status according to the BWP information indicated by the DCI, such as switching to a dormant BWP or switching from a dormant BWP to a non-dormant BWP. The terminal update status may require a corresponding update by the RF module or the baseband module. If the DCI carried by the PDCCH indicates BWP information and the PDCCH can be configured on any symbol of a time slot, then the terminal, in some embodiments, needs to be ready to update the terminal status at any time, which requires a higher implementation complexity of the terminal.

One method is that the base station sends the PDCCH carrying the status information DCI within the first 3 symbols of the time slot. Another method is that the terminal receives the PDCCH carrying the status information DCI within the first 3 symbols of the slot. The terminal status information includes at least one of the following: energy saving information, secondary cell sleep information, and BWP information.

3.3. Configuration Case 3

According to Case 2 (as discussed herein), the DCI carried by the PDCCH may be a DCI format 2_6 according to Case 2 (as discussed herein).

3.2.1 Example Embodiment(s)

The DCI format 2_6 can be used to indicate energy saving information, and can also be used to indicate secondary cell sleep information. If the DCI carried by the PDCCH is the DCI format 2_6, the terminal may receive the PDCCH within the first three symbols of the time slot. In this embodiment, regardless of whether the DCI format 2_6 carried by the PDCCH indicates the terminal to update status or not, the terminal may receive the PDCCH within the first three symbols of the time slot, which helps further reduce the complexity of the terminal implementation. If the DCI carried by the PDCCH is the DCI format 2_6, then the base station may send the PDCCH within the first three symbols of the time slot. In this embodiment, no matter whether the DCI format 2_6 carried by the PDCCH indicates the terminal to update status or not, the base station may send the PDCCH within the first three symbols of the time slot, which helps to further reduce the complexity of the terminal implementation.

3.4. Configuration Case 4

According to Case 2 (as discussed herein), the DCI carried by the PDCCH may include a secondary cell dormancy indication (SCell Dormancy Indication) field according to Case 2 (as discussed herein).

3.4.1 Example Embodiment(s)

The DCI format 2_6 can be used to indicate energy saving information, and can also be used to indicate secondary cell sleep information. The secondary cell dormancy indication (SCell Dormancy Indication) field in the DCI format 2_6 may be used to indicate the secondary cell dormancy information. According to different RRC configurations, the DCI format 2_6 may include the SCell Dormancy Indication field, or it may not include the SCell Dormancy Indication field. If the DCI carried by the PDCCH is the DCI format 2_6 and the DCI includes the SCell Dormancy Indication field, then the terminal may receive the PDCCH within the first three symbols of the time slot. If the DCI carried by the PDCCH is the DCI format 2_6 and the DCI includes a secondary cell dormancy indication (SCell Dormancy Indication) field, then the base station may send the PDCCH within the first three symbols of the time slot.

The DCI format 0_1 can be used to indicate the secondary cell sleep information, and the DCI format 0_1's SCell Dormancy Indication field is used to indicate the secondary cell sleep information. According to different RRC configurations, DCI format 0_1 may include the SCell Dormancy Indication field, or it may not include the SCell Dormancy Indication field. If the DCI carried by the PDCCH is the DCI format 0_1 and the DCI includes a SCell Dormancy Indication field, then the terminal may receive the PDCCH within the first three symbols of the time slot. If the DCI carried by the PDCCH is the DCI format 0_1 and the DCI includes a SCell Dormancy Indication field, then the base station may send the PDCCH within the first three symbols of the time slot.

The DCI format 1_1 can be used to indicate the secondary cell sleep information, and the secondary cell sleep indication (SCell Dormancy Indication) field in the DCI format 1_1 is used to indicate the secondary cell sleep information. According to different RRC configurations, DCI format 1_1 may include the SCell Dormancy Indication field, or it may not include the SCell Dormancy Indication field. If the DCI carried by the PDCCH is the DCI format 1_1 and the DCI includes a secondary cell dormancy indication (SCell Dormancy Indication) field, then the terminal may receive the PDCCH within the first three symbols of the time slot. If the DCI carried by the PDCCH is the DCI format 1_1 and the DCI includes the SCell Dormancy Indication field, then the base station may send the PDCCH within the first three symbols of the time slot.

3.5. Configuration Case 5

According to Case 4 (as discussed herein), the secondary cell dormancy indication (SCell Dormancy Indication) field may include in the DCI according to case 4 (as discussed herein), and instruct the terminal to switch the active BWP on at least one secondary cell.

3.5.1 Example Embodiment(s)

The DCI format 2_6 can be used to indicate energy saving information, and can also be used to indicate secondary cell sleep information. The secondary cell dormancy indication (SCell Dormancy Indication) field in the DCI format 2_6 may be used to indicate the secondary cell dormancy information. If the DCI carried by the PDCCH is the DCI format 2_6 and the SCell Dormancy Indication field included in the DCI instructs the terminal to switch the active BWP on at least one secondary cell, then the terminal may receive the PDCCH within the first three symbols of the time slot. If the DCI carried by the PDCCH is the DCI format 2_6 and the SCell Dormancy Indication field included in the DCI instructs the terminal to switch the active BWP on at least one secondary cell, then the base station may send the PDCCH within the first three symbols of the time slot.

The DCI format 0_1 can be used to indicate the secondary cell sleep information, and the DCI format 0_1's SCell Dormancy Indication field is used to indicate the secondary cell sleep information. If the DCI carried by the PDCCH is the DCI format 0_1 and the SCell Dormancy Indication field included in the DCI instructs the terminal to switch the active BWP on at least one secondary cell, then the terminal may receive this PDCCH within the first three symbols of the time slot PDCCH. If the DCI carried in the PDCCH is the DCI format 0_1 and the SCell Dormancy Indication field included in the DCI instructs the terminal to switch the active BWP on at least one secondary cell, then the base station may send the PDCCH within the first three symbols of the time slot.

The DCI format 1_1 can be used to indicate the secondary cell sleep information, and the secondary cell sleep indication (SCell Dormancy Indication) field in the DCI format 1_1 is used to indicate the secondary cell sleep information. If the DCI carried by the PDCCH is the DCI format 1_1 and the SCell Dormancy Indication field included in the DCI instructs the terminal to switch the active BWP on at least one secondary cell, then the terminal may receive the PDCCH within the first three symbols of the time slot. If the DCI carried by the PDCCH is the DCI format 1_1 and the SCell Dormancy Indication field included in the DCI instructs the terminal to switch the active BWP on at least one secondary cell, then the base station may send the PDCCH within the first three symbols of the time slot.

3.6. Configuration Case 6

According to Case 4 (as discussed herein), the secondary cell dormancy indication (SCell Dormancy Indication) field may be included in the DCI according to Case 4 (as discussed herein), and may instruct the terminal to switch the active BWP on at least one secondary cell group.

3.6.1 Example Embodiment(s)

The DCI format 2_6 can be used to indicate energy saving information, and can also be used to indicate secondary cell sleep information. The secondary cell dormancy indication (SCell Dormancy Indication) field in the DCI format 2_6 may be used to indicate the secondary cell dormancy information. Each bit in the SCell Dormancy Indication field may correspond to a secondary cell group, and each secondary cell group includes at least one secondary cell. If the DCI carried by the PDCCH is the DCI format 2_6 and the SCell Dormancy Indication field included in the DCI instructs the terminal to switch the active BWP on at least one secondary cell group, then the terminal may receive the PDCCH within the first three symbols of the time slot. If the DCI carried by the PDCCH is the DCI format 2_6 and the SCell Dormancy Indication field included in the DCI instructs the terminal to switch the active BWP on at least one secondary cell group, then the base station may send the PDCCH within the first three symbols of the time slot.

The DCI format 0_1 can be used to indicate the secondary cell sleep information, and the DCI format 0_1's SCell Dormancy Indication field is used to indicate the secondary cell sleep information. Each bit in the SCell Dormancy Indication field may correspond to a secondary cell group, and each secondary cell group includes at least one secondary cell. If the DCI carried by the PDCCH is the DCI format 0_1 and the SCell Dormancy Indication field included in the DCI instructs the terminal to switch the active BWP on at least one secondary cell group, then the terminal may receive this PDCCH within the first three symbols of the time slot. If the DCI carried in the PDCCH is the DCI format 0_1 and the SCell Dormancy Indication field included in the DCI instructs the terminal to switch the active BWP on at least one secondary cell group, then the base station may send the PDCCH within the first three symbols of the time slot.

The DCI format 1_1 can be used to indicate the secondary cell sleep information, and the secondary cell sleep indication (SCell Dormancy Indication) field in the DCI format 1_1 may be used to indicate the secondary cell sleep information. Each bit in the SCell Dormancy Indication field may correspond to a secondary cell group, and each secondary cell group includes at least one secondary cell. If the DCI carried in the PDCCH is the DCI format 1_1 and the SCell Dormancy Indication field included in the DCI instructs the terminal to switch the active BWP on at least one secondary cell group, then the terminal may receive the PDCCH within the first three symbols of the time slot. If the DCI carried in the PDCCH is the DCI format 1_1 and the SCell Dormancy Indication field included in the DCI instructs the terminal to switch the active BWP on at least one secondary cell group, then the base station may send the PDCCH within the first three symbols of the time slot.

3.7. Configuration Case 7

According to Case 2 (as discussed herein), in a case (such as Case 2, as discussed herein) where the DCI carried by the PDCCH is used to indicate the sleeping information of the secondary cell, the DCI may instruct the terminal to switch the active BWP on at least one secondary cell.

3.7.1 Example Embodiment(s)

In the existing implementation, when the DCI format 1_1 satisfies the following two conditions, then the DCI format 1_1 may be used to indicate the secondary cell sleep information.

In a first condition, the DCI format 1_1 may be scrambled by Cell Radio Network Temporary Identifier (C-RNTI) or Modulation and Coding Scheme (MCS)-C-RNTI.

In a second condition, if resourceAllocation=resourceAllocationType0 and all bits of the frequency domain resource assignment field in DCI format 1_1 are equal to 0; or if resourceAllocation=resourceAllocationType1 and all bits of the frequency domain resource assignment field in DCI format 1_1 are equal to 1; or if resourceAllocation=dynamicSwitch and all bits of the frequency domain resource assignment field in DCI format 1_1 are equal to 0 or 1.

The DCI format 1_1 satisfying the above two conditions (e.g., the first or second conditions) may indicate the sleep information of the secondary cell through the MCS domain, NDI domain, RV domain, HARQ process number domain, antenna port domain, and/or DMRS sequence initialization domain.

In the case that the DCI carried by the PDCCH is the DCI format 1_1 and the DCI satisfies the above conditions so that the DCI is used to indicate the secondary cell sleep information, if the DCI format 1_1 instructs the terminal to switch the active BWP on at least one secondary cell, then the terminal may receive the PDCCH within the first three symbols of the slot. In the case that the DCI carried in the PDCCH is the DCI format 1_1 and the DCI satisfies the above conditions and the DCI is used to indicate the secondary cell sleep information, if the DCI format 1_1 instructs the terminal to switch the active BWP on at least one secondary cell, then the base station transmits the PDCCH within the first three symbols of the slot.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method, comprising:
   receiving, by a wireless communication device from a base station, configuration, wherein the configuration indicates a first carrier and a second carrier to the wireless communication device, wherein the wireless communication device supports transmitting a single-port uplink signal on the first carrier, wherein the wireless communication device supports transmitting a single-port uplink signal or a dual-port uplink signal on the second carrier;
   determining, by the wireless communication device, that a previous uplink transmission was a single-port uplink signal transmitted on the first carrier and scheduling information indicates the wireless communication device to transmit a dual-port uplink signal on the second carrier;
   switching, by the wireless communication device, to the second carrier indicated by the scheduling information for communicating the dual-port uplink signal; and
   not transmitting any uplink signal on any of the first carrier and the second carrier during a switching time before communicating the dual-port uplink signal.

2. The method of claim 1, wherein:
   determination of the previous uplink transmission comprises: determining, by the wireless communication device, that the previous uplink transmission was transmitted on the first carrier and the scheduling information indicates the wireless communication device to transmit a next uplink signal on the second carrier; and
   switching of carrier comprises: switching, by the wireless communication device to the second carrier, to transmit the next uplink signal.

3. The method of claim 1, wherein:
   determination of the previous uplink transmission comprises: determining, by the wireless communication device, that the previous uplink transmission was transmitted on the second carrier and the scheduling information indicates the wireless communication device to transmit a next uplink signal on the first carrier;
   switching of carrier comprises: switching, by the wireless communication device to the first carrier to transmit the next uplink signal; and
   not transmitting any uplink signal comprises: not transmitting any uplink signal on any of the first carrier and the second carrier during the switching time before transmitting the next uplink signal.

4. The method of claim 1, comprising wherein:
   determination of the previous uplink transmission comprises: determining, by the wireless communication device, that the previous uplink transmission was a dual-port uplink signal transmitted on the second carrier and the scheduling information indicates the wireless communication device to transmit a next uplink signal on the first carrier;
   switching of carrier comprises: switching, by the wireless communication device to the first carrier to transmit the next uplink signal; and
   not transmitting any uplink signal comprises: not transmitting any uplink signal on any of the first carrier and the second carrier during the switching time before transmitting the next uplink signal.

5. A wireless communication device, comprising:
   at least one processor configured to:
      receive, via a transceiver from a base station, configuration, wherein the configuration indicates a first carrier and a second carrier to the wireless communication device, wherein the wireless communication device supports transmitting a single-port uplink signal on the first carrier, wherein the wireless communication device supports transmitting a single-port uplink signal or a dual-port uplink signal on the second carrier;
      determine that a previous uplink transmission was a single-port uplink signal transmitted on the first carrier and scheduling information indicates the wireless communication device to transmit a dual-port uplink signal on the second carrier;
      switch to the second carrier indicated by the scheduling information for communicating the dual-port uplink signal; and
      not transmit any uplink signal on any of the first carrier and the second carrier during a switching time before communicating the dual-port uplink signal.

6. The wireless communication device of claim 5, wherein:
   to determine the previous uplink transmission, the at least one processor is configured to: determine that the previous uplink transmission was transmitted on the first carrier and the scheduling information indicates the wireless communication device to transmit a next uplink signal on the second carrier; and
   to switch carrier, the at least one processor is configured to: switch to the second carrier to transmit the next uplink signal.

7. The wireless communication device of claim 5, wherein:
- to determine the previous uplink transmission, the at least one processor is configured to: determine that the previous uplink transmission was transmitted on the second carrier and the scheduling information indicates the wireless communication device to transmit a next uplink signal on the first carrier;
- to switch carrier, the at least one processor is configured to: switch to the first carrier to transmit the next uplink signal; and
- to not transmit, the at least one processor is configured to: not transmit any uplink signal on any of the first carrier and the second carrier during the switching time before transmitting the next uplink signal.

8. The wireless communication device of claim 5, wherein:
- to determine the previous uplink transmission, the at least one processor is configured to: determine that the previous uplink transmission was a dual-port uplink signal transmitted on the second carrier and the scheduling information indicates the wireless communication device to transmit a next uplink signal on the first carrier;
- to switch carrier, the at least one processor is configured to: switch to the first carrier to transmit the next uplink signal; and
- to not transmit, the at least one processor is configured to: not transmit any uplink signal on any of the first carrier and the second carrier during the switching time before transmitting the next uplink signal.

9. A method, comprising:
- receiving, by a wireless communication device from a base station, configuration, wherein the configuration indicates a first carrier and a second carrier to the wireless communication device, wherein the wireless communication device supports transmitting a single-port uplink signal on the first carrier, wherein the wireless communication device supports transmitting a single-port uplink signal or a dual-port uplink signal on the second carrier;
- determining, by the wireless communication device, that a previous uplink transmission was a dual-port uplink signal transmitted on the second carrier and scheduling information indicates the wireless communication device to transmit a next uplink signal on the first carrier;
- switching, by the wireless communication device, to the first carrier indicated by the scheduling information for communicating a next uplink signal; and
- not transmitting any uplink signal on any of the first carrier and the second carrier during a switching time before the next uplink signal is transmitted.

10. The method of claim 9, wherein:
- determination of the previous uplink transmission comprises: determining, by the wireless communication device, that the previous uplink transmission was transmitted on the first carrier and the scheduling information indicates the wireless communication device to transmit the next uplink signal on the second carrier; and
- switching of carrier comprises: switching, by the wireless communication device, to the second carrier, to transmit the next uplink signal.

11. The method of claim 9, wherein:
- determination of the previous uplink transmission comprises: determining, by the wireless communication device, that the previous uplink transmission was the single-port uplink signal transmitted on the first carrier and the scheduling information indicates the wireless communication device to transmit the dual-port uplink signal on the second carrier;
- switching of carrier comprises: switching, by the wireless communication device, to the second carrier to transmit the dual-port uplink signal; and
- non-transmission of any uplink signal comprises: not transmitting any uplink signal on any of the first carrier and the second carrier during the switching time before transmitting the dual-port uplink signal.

12. A wireless communication device, comprising:
at least one processor configured to:
- receive, via a transceiver from a base station, configuration, wherein the configuration indicates a first carrier and a second carrier to the wireless communication device, wherein the wireless communication device supports transmitting a single-port uplink signal on the first carrier, wherein the wireless communication device supports transmitting a single-port uplink signal or a dual-port uplink signal on the second carrier;
- determine that a previous uplink transmission was a dual-port uplink signal transmitted on the second carrier and scheduling information indicates the wireless communication device to transmit a next uplink signal on the first carrier;
- switch to the first carrier indicated by the scheduling information for communicating a next uplink signal; and
- not transmit any uplink signal on any of the first carrier and the second carrier during a switching time before the next uplink signal is transmitted.

13. The wireless communication device of claim 12, wherein:
- to determine the previous uplink transmission, the at least one processor is configured to: determine that the previous uplink transmission was transmitted on the first carrier and the scheduling information indicates the wireless communication device to transmit the next uplink signal on the second carrier; and
- to switch carrier, the at least one processor is configured to: switch to the second carrier, to transmit the next uplink signal.

14. The wireless communication device of claim 12, wherein:
- to determine the previous uplink transmission, the at least one processor is configured to: determine that the previous uplink transmission was the single-port uplink signal transmitted on the first carrier and the scheduling information indicates the wire less communication device to transmit the dual-port uplink signal on the second carrier;
- to switch carrier, the at least one processor is configured to: switch to the second carrier to transmit the dual-port uplink signal; and
- to not transmit, the at least one processor is configured to: not transmit any uplink signal on any of the first carrier and the second carrier during the switching time before transmitting the dual-port uplink signal.

* * * * *